United States Patent
Naito

(10) Patent No.: US 8,594,533 B2
(45) Date of Patent: Nov. 26, 2013

(54) SCANNING OPTICAL APPARATUS AND IMAGE FORMING APPARATUS USING THE SAME

(75) Inventor: Yuuta Naito, Tokyo (JP)

(73) Assignee: Canon Kabushiki Kaisha (JP)

(*) Notice: Subject to any disclaimer, the term of this patent is extended or adjusted under 35 U.S.C. 154(b) by 257 days.

(21) Appl. No.: 12/902,582

(22) Filed: Oct. 12, 2010

(65) Prior Publication Data

US 2011/0116835 A1  May 19, 2011

(30) Foreign Application Priority Data

Nov. 6, 2009  (JP) ................................. 2009-255155

(51) Int. Cl.
  *G03G 15/28*  (2006.01)
  *B41J 2/447*  (2006.01)
(52) U.S. Cl.
  USPC ........................... 399/151; 347/232; 347/259
(58) Field of Classification Search
  USPC .................... 399/151; 347/232, 259
  See application file for complete search history.

(56) References Cited

U.S. PATENT DOCUMENTS

| | | | |
|---|---|---|---|
| 6,587,137 B2* | 7/2003 | Shinohara et al. | 347/235 |
| 6,785,029 B2 | 8/2004 | Takada et al. | |
| 2002/0041419 A1 | 4/2002 | Takada et al. | |
| 2002/0057327 A1 | 5/2002 | Yoshida | |
| 2009/0153644 A1* | 6/2009 | Naito | 347/243 |

FOREIGN PATENT DOCUMENTS

| | | |
|---|---|---|
| JP | 06347713 A | 12/1994 |
| JP | 11-326807 A | 11/1999 |
| JP | 2001-337285 A | 12/2001 |
| JP | 2002174787 A | 6/2002 |
| JP | 2005266253 A | 9/2005 |
| JP | 2008026410 A | 2/2008 |

OTHER PUBLICATIONS

KR Office Action issued Nov. 15, 2012 for corresponding KR 10-2010-0107451 (English Translation provided).

* cited by examiner

*Primary Examiner* — Omar Rojas
(74) *Attorney, Agent, or Firm* — Rossi, Kimms & McDowell LLP

(57) ABSTRACT

A scanning optical apparatus includes scanning units, a deflector. Each of the apparatuses includes a light source, an imaging optical system including imaging optical elements imaging a beam deflected by the deflector on a scanning surface. The scanning surfaces are scanned with beams in opposing directions. When a main scanning direction of the first scanning unit is a Y positive direction, a sign is the same between $\theta 1h(Y1min) \times \theta 1r$ and $\theta 2h(Y1min) \times \theta 2r$. Here, $\theta 1h(y)$, $\theta 2h(y)$ denote orientation angles between the Y axis and a slow axis at a Y direction position y of first/second imaging optical elements from an optical axis, the imaging optical elements each being an imaging optical element having a largest thickness among them of the imaging optical systems, $\theta 1r$ and $\theta 2r$ denote angles between the Y axis and polarization directions of the beams reaching the imaging optical elements, and Y1min denotes a Y position where $\theta 1h(y)$ becomes minimum.

18 Claims, 17 Drawing Sheets

IMAGE HEIGHT Y (mm)

IMAGE HEIGHT Y (mm)

SCANNING OPTICAL APPARATUS AND IMAGE FORMING APPARATUS USING THE SAME

BACKGROUND OF THE INVENTION

1. Field of the Invention

The present invention relates to a scanning optical apparatus and an image forming apparatus using the same, which are suitable for an image forming apparatus using an electrophotography process such as a color laser beam printer, a color digital copying machine, or a color multifunction printer.

2. Description of the Related Art

A color image forming apparatus such as a color laser printer in recent years needs to satisfy high demands for low cost, high speed, and high image quality. As a method of realizing high speed of the color image forming apparatus, there is widely known a tandem method in which an image bearing member disposed for each color separately is scanned by a light beam so that an image for each color is formed, and later the plurality of images are superposed on a transferring medium so as to form a color image.

In addition, for realizing high speed printing, a light source emitting a plurality of light beams may be used. In this case, if polarization directions of the light beams are not uniform, a ratio between P polarization component and S polarization component (polarization component ratio) for an optical element that transmits or reflects the light beams before reaching a photosensitive member as the image bearing member is different among the light beams. As a result, a light amount at each image height on a surface to be scanned (illuminance distribution) is different among the light beams.

In order to solve this problem, there is known a scanning optical apparatus in which P polarization reflectance and S polarization reflectance are set to be substantially the same for the optical element that transmits or reflects the light beams. Thus, even in the case where the polarization component ratio changes from a design value, unevenness in illuminance distribution on the surface to be scanned is decreased.

For instance, Japanese Patent Application Laid-Open No. H11-326807 discloses an example in which a linear polarization direction of a laser is adjusted for correcting shading (illuminance distribution) on an image bearing member. Japanese Patent Application Laid-Open No. 2001-337285 discloses an example in which reflectances for S-polarized and P-polarized lights are set to be substantially the same as each other so that an illuminance distribution becomes uniform.

However, in the conventional technology described above in Japanese Patent Application Laid-Open No. H11-326807, it is necessary to adjust the polarization direction of each of the lasers while checking the illuminance distribution to correct the illuminance distribution. Therefore, as the number of light sources increases, assembly cost in the adjustment increases. In addition, in the conventional technology described above in Japanese Patent Application Laid-Open No. 2001-337285, it is difficult to set exactly the same reflectance for the P-polarized light and for the S-polarized light.

SUMMARY OF THE INVENTION

Therefore, an object of the present invention is to provide a scanning optical apparatus that can make the illuminance distribution uniform between optical paths without adjustment and with a simple structure, and an image forming apparatus including the scanning optical apparatus.

According to a first aspect of the present invention, there is provided a scanning optical apparatus, including: a first scanning unit, a second scanning unit, and a deflecting unit which deflects a light beam for scanning and is shared by the first scanning unit and the second scanning unit, in which: the first scanning unit includes a first light source unit, a first incident optical system which guides a light beam emitted from the first light source unit to a first deflecting surface of the deflecting unit, and a first imaging optical system which is disposed in an optical path of the light beam emitted from the first light source unit and deflected by the deflecting unit and includes at least one imaging optical element for imaging the light beam deflected by the first deflecting surface on a first surface to be scanned, the second scanning unit includes a second light source unit, a second incident optical system which guides a light beam emitted from the second light source unit to a second deflecting surface of the deflecting unit, which is different from the first deflecting surface for deflecting the light beam from the first light source unit, and a second imaging optical system which is disposed in an optical path of the light beam emitted from the second light source unit and deflected by the deflecting unit and includes at least one imaging optical element for imaging the light beam deflected by the second deflecting surface on a second surface to be scanned, the light beam from the first light source unit and the light beam from the second light source unit scan the first surface to be scanned and the second surface to be scanned by the rotation of the deflecting unit in directions opposed to each other in a main scanning direction, and when an imaging optical element having a largest maximum value of a thickness in an optical axis direction of the at least one imaging optical element included in the first imaging optical system is defined as a first imaging optical element, an imaging optical element having a largest maximum value of a thickness in an optical axis direction of the at least one imaging optical element included in the second imaging optical system is defined as a second imaging optical element, and a direction in which the first surface to be scanned is scanned with the light beam from the first light source unit in the main scanning direction is defined as a positive direction of a Y axis, the following expressions are satisfied;

$\theta 2h(Y1\min) \times \theta 2r > 0$, in a case where $\theta 1h(Y1\min) \times \theta 1r > 0$ is satisfied, and $\theta 2h(Y1\min) \times \theta 2r < 0$, in a case where $\theta 1h(Y1\min) \times \theta 1r < 0$ is satisfied, where $\theta 1h(y)$ and $\theta 2h(y)$ respectively denote orientation angles that are angles between the main scanning direction and a slow axis direction at a position y in the Y axis direction when a position of the optical axis is regarded as an origin of the Y axis in the first imaging optical element and the second imaging optical element, $\theta 1r$ and $\theta 2r$ respectively denote angles between the Y axis and polarization directions of the light beams reaching the first imaging optical element and the second imaging optical element, and Y1min denotes a position in the Y axis direction at which the orientation angle $\theta 1h(y)$ becomes minimum.

According to a second aspect of the present invention, there is provided a scanning optical apparatus, including: a first scanning unit, a second scanning unit; and a deflecting unit which deflects a light beam for scanning and is shared by the first scanning unit and the second scanning unit, in which: the first scanning unit includes a first light source unit, a first incident optical system which guides a light beam emitted from the first light source unit to a deflecting surface of the deflecting unit, and a first imaging optical system which is disposed in an optical path of the light beam emitted from the first light source unit and deflected by the deflecting unit and includes at least one imaging optical element for imaging the light beam deflected by the deflecting surface on a first surface to be scanned, the second scanning unit includes a second light source unit, a second incident optical system which guides a light beam emitted from the second light source unit to the deflecting surface for deflecting the light beam from the first light source unit, and a second imaging optical system which is disposed in an optical path of the light beam emitted from the second light source unit and deflected by the deflecting unit and includes at least one imaging optical element for imaging the light beam deflected by the deflecting surface on a second surface to be scanned, the first incident optical system and the second incident optical system respectively guide the light beam from the first light source unit and the light beam from the second light source unit to enter the deflecting surface of the deflecting unit obliquely in a sub-scanning direction, and when an imaging optical element having a largest maximum value of a thickness in an optical axis direction of the at least one imaging optical element included in the first imaging optical system is defined as a first imaging optical element, an imaging optical element having a largest maximum value of a thickness in an optical axis direction of the at least one imaging optical element included in the second imaging optical system is defined as a second imaging optical element, an orientation angle defined as an angle between a slow axis direction and a main scanning direction in the first imaging optical element and the second imaging optical element has a difference of 15 degrees or larger between a maximum value and a minimum value in the main scanning direction, and a direction in which the first surface to be scanned is scanned with the light beam from the first light source unit in the main scanning direction is defined as a positive direction of a Y axis, the following expressions are satisfied;

$\theta 2h(Y1\min) \times \theta 2r > 0$, in a case where $\theta 1h(Y1\min) \times \theta 1r > 0$ is satisfied, and $\theta 2h(Y1\min) \times \theta 2r < 0$, in a case where $\theta 1h(Y1\min) \times \theta 1r < 0$ is satisfied, where $\theta 1h(y)$ and $\theta 2h(y)$ respectively denote orientation angles at a position y in the Y axis direction when a position of the optical axis is regarded as an origin of the Y axis in the first imaging optical element and the second imaging optical element, $\theta 1r$ and $\theta 2r$ respectively denote angles between the Y axis and polarization directions of the light beams reaching the first imaging optical element and the second imaging optical element, and Y1min denotes a position in the Y axis direction at which the orientation angle $\theta 1h(y)$ becomes minimum.

According to the present invention, it is possible to provide the scanning optical apparatus and the image forming apparatus having little unevenness of the illuminance distribution among a plurality of optical paths so that a high quality image can be formed.

Further features of the present invention will become apparent from the following description of exemplary embodiments with reference to the attached drawings.

DESCRIPTION OF THE EMBODIMENTS

Hereinafter, preferred embodiments of the present invention are described in detail with reference to the attached drawings.

First Embodiment

Figure 1:
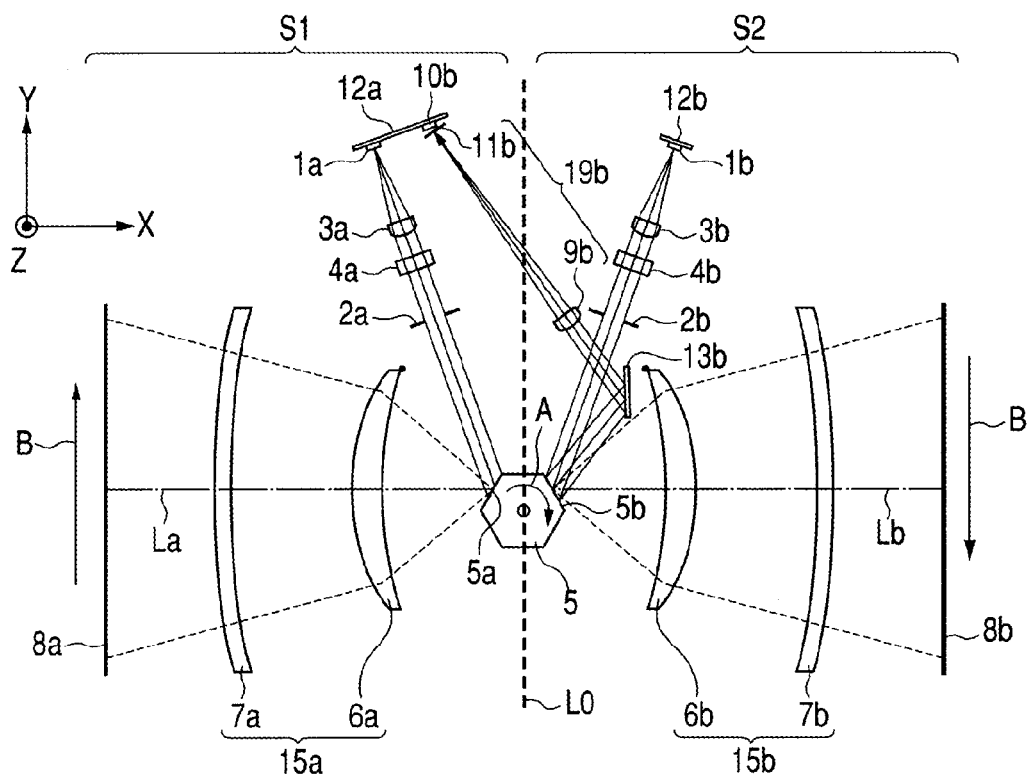
FIG. 1 is a schematic diagram of a main part of a main scanning cross section according to a first embodiment of the present invention.

FIG. 1 is a cross sectional view in a main scanning direction (main scanning cross sectional view) of a main part of a scanning optical apparatus according to a first embodiment of the present invention.

The scanning optical apparatus according to the first embodiment includes a first scanning unit S1 and a second scanning unit S2 (hereinafter, the scanning unit is also referred to as a "station"), and a deflecting unit 5 that is shared by the first scanning unit S1 and the second scanning unit S2. Hereinafter, among the members of the second scanning unit S2, the same members as those in the first scanning unit S1 are denoted in parentheses.

Further, in the following description, the main scanning direction corresponds to a direction perpendicular to the rotation axis of the deflecting unit and to the optical axis of an imaging optical system (X direction), namely a direction in which the light beam is reflected and deflected by the deflecting unit (deflected for scanning). The Y direction is set to the main scanning direction in the first scanning unit. A sub-scanning direction (Z direction) corresponds to a direction parallel to the rotation axis of the deflecting unit. The main scanning cross section means a plane including the optical axis of the imaging optical system and the main scanning direction, and the sub-scanning cross section means a cross section that includes the optical axis of the imaging optical system and is perpendicular to the main scanning cross section.

The first scanning unit S1 (second scanning unit S2) includes a first light source 1a (second light source 1b) which emits one or more light beams, and a collimator lens 3a (3b) which changes condensing state of an incident light beam and emits the same. The first scanning unit S1 (second scanning unit S2) further includes a cylindrical lens 4a (4b) having refractive power only in the sub-scanning direction, an aperture stop 2a (2b) which restricts a light beam width in the main scanning direction, and an optical deflector (deflector) 5 as the deflecting unit.

Further, the first scanning unit S1 (second scanning unit S2) includes a first imaging optical system 15a (second imaging optical system 15b) which forms a spot of the light beam from the optical deflector 5 on a corresponding first surface to be scanned 8a (second surface to be scanned 8b).

The first and second scanning units S1 and S2 share the same optical deflector (deflecting unit) 5. In addition, the first and second scanning units S1 and S2 use different light beams reflected and deflected (deflected for scanning) by a first deflecting surface 5a and a second deflecting surface 5b of the optical deflector 5.

In addition, a "light source unit" constituting the light source 1a (1b) emits a light beam for optical scanning and is constituted of a semiconductor laser or a light emitting diode.

The collimator lens 3a (3b) couples the light beam from the light source 1a (1b) and converts the light beam emitted from the light source 1a (1b) into a "parallel light beam" or a "weakly converging light beam" or a "weakly diverging light beam". The cylindrical lens 4a (4b) has power of refracting the light beam coupled by the collimator lens 3a (3b) only in the sub-scanning direction so that the light beam is condensed onto the deflecting surface 5a (5b) of the optical deflector 5 like a line elongated in the main scanning direction.

Note that, the light source 1a (1b), the collimator lens 3a (3b), the cylindrical lens 4a (4b), and other elements constitute a first incident optical system (second incident optical system).

The optical deflector 5 is constituted of, for example, a rotational polygon mirror (polygon mirror) having six surfaces, and a radius of its circumscribed circle is 40 mm. The optical deflector 5 is driven by a drive unit such as a motor (not shown) to rotate at a constant speed.

Each of the scanning lens systems (imaging optical systems) 15a (15b) is constituted of two scanning lenses (imaging lenses), which are a scanning lens 6a (6b) on the optical deflector side and a scanning lens 7a (7b) on the surface-to-be-scanned side, and forms a spot-like image of the light beam reflected and deflected by the optical deflector 5 on the surface to be scanned 8a or 8b.

In addition, the scanning lens systems 15a and 15b have an optical face tangle error correction function for the deflecting surfaces 5a and 5b, which is realized by establishing a conjugate relationship between the deflecting surface or its vicinity of the optical deflector 5 and the surface to be scanned 8a or 8b or its vicinity in the sub-scanning cross section.

Each of the scanning lenses 6a, 7a, 6b, and 7b is constituted of a plastic lens having a surface of an aspherical shape with high flexibility of design.

In this embodiment, the shapes of the scanning lenses 6 and 7 can be expressed as follows. When the X axis corresponds to directions of optical axes La and Lb of the imaging optical systems 15a and 15b, the Y axis corresponds to a direction perpendicular to the optical axes La and Lb in the main scanning cross section, and the Z axis corresponds to a direction perpendicular to the optical axes La and Lb in the sub-scanning cross section.

The surface shape of the scanning lenses 6 and 7 in the main scanning cross section is expressed as follows.

$$x = \frac{\frac{y^2}{R}}{1 + \sqrt{1-(1+K)(y/R)^2}} + B_4 y^4 + B_6 y^6 + B_8 y^8 + B_{10} y^{10}$$

where R denotes a curvature radius, and K, $B_4$, $B_6$, $B_8$, and $B_{10}$ denote aspheric coefficients.

As to the shape in the sub-scanning cross section, the curvatures of both the incident surface and the exit surface of the scanning lenses 6 and 7 are changed continuously in an effective portion of the scanning lens 7.

The exit surface of the scanning lens 7 is configured to have a largest refractive power (power is an inverse number of the focal length) among lens surfaces constituting the scanning lens systems 15a and 15b.

The shape of the scanning lenses 6 and 7 in the sub-scanning cross section is expressed by the following continuous function.

$$s = \frac{\frac{z^2}{r'}}{1 + \sqrt{1 - \left(\frac{z}{r'}\right)^2}}$$

$$r' = r(1 + D_2 y^2 + D_4 y^4 + D_6 y^6 + D_8 y^8 + D_{10} y^{10})$$

where r' denotes a curvature radius in the sub-scanning direction, and $D_2, D_4, D_6, D_8$, and $D_{10}$ denote aspheric coefficients. Note that, the curvature radius in the sub-scanning direction means a curvature radius in the cross section perpendicular to a shape (meridian line) in the main scanning direction.

The following table shows parameters indicating lens surface shapes of the scanning lens 6 (scanning lens on the side of optical deflector) and the scanning lens 7 (scanning lens on the side of surface to be scanned) in this embodiment. In the table, the incident surface of the scanning lens 6 is referred to as a first surface, the exit surface of the scanning lens 6 is referred to as a second surface, the incident surface of the scanning lens 7 is referred to as a third surface, and the exit surface of the scanning lens 7 is referred to as a fourth surface. In addition, a scanning start side means a range from the lower side to the optical axis La in FIG. 1 for the scanning lenses 6a and 7a of the first scanning unit S1, and a range from the upper side to the optical axis Lb in FIG. 1 for the scanning lenses 6b and 7b of the second scanning unit S2. In addition, a scanning end side means a range above the optical axis La in FIG. 1 for the scanning lenses 6a and 7a of the first scanning unit S1, and a range below the optical axis Lb in FIG. 1 for the scanning lenses 6b and 7b of the second scanning unit S2. As shown in the table, as to the exit surface (fourth surface) of the scanning lens 7, the shape in the sub-scanning cross section is different between the scanning start side and the scanning end side.

TABLE 1

Surface shape of scanning lens on side of optical deflector

| | First surface | | Second surface | |
| --- | --- | --- | --- | --- |
| | Scanning start side (s) | Scanning end side (e) | Scanning start side (s) | Scanning end side (e) |
| R | −6.39E+01 | −6.39E+01 | −4.17E+01 | −4.17E+01 |
| K | −4.85E+00 | −4.85E+00 | −1.30E+00 | −1.30E+00 |
| B4 | 2.88996E−07 | 2.88996E−07 | 7.71306E−08 | 7.71306E−08 |
| B6 | −2.57796E−10 | −2.57796E−10 | 1.27316E−10 | 1.27316E−10 |
| B8 | −5.11634E−14 | −5.11634E−14 | −3.66856E−13 | −3.66856E−13 |
| B10 | 9.71935E−17 | 9.71935E−17 | 1.58269E−16 | 1.58269E−16 |
| R | −1.00E+03 | −1.00E+03 | −1.00E+03 | −1.00E+03 |
| D2 | 0 | 0 | 0 | 0 |
| D4 | 0 | 0 | 0 | 0 |
| D6 | 0 | 0 | 0 | 0 |

TABLE 1-continued

| D8 | 0 | 0 | 0 | 0 |
| --- | --- | --- | --- | --- |
| D10 | 0 | 0 | 0 | 0 |

Surface shape of scanning lens on side of surface to be scanned

| | Third surface | | Fourth surface | |
| --- | --- | --- | --- | --- |
| | Scanning start side (s) | Scanning end side (e) | Scanning start side (s) | Scanning end side (e) |
| R | −1.16E+03 | −1.16E+03 | 1.58E+03 | 1.58E+03 |
| K | 0 | 0 | −1.38E+03 | −1.38E+03 |
| B4 | 0 | 0 | −1.65228E−07 | −1.65228E−07 |
| B6 | 0 | 0 | 1.1599E−11 | 1.1599E−11 |
| B8 | 0 | 0 | −6.81945E−16 | −6.81945E−16 |
| B10 | 0 | 0 | 1.79775E−20 | 1.79775E−20 |
| R | −1.00E+03 | −1.00E+03 | −3.33E+01 | −3.33E+01 |
| D2 | 0 | 0 | 4.77405E−05 | 5.1174E−05 |
| D4 | 0 | 0 | −6.41991E−09 | −7.53906E−09 |
| D6 | 0 | 0 | 6.47753E−13 | 1.02616E−12 |
| D8 | 0 | 0 | −3.27826E−17 | −9.21921E−17 |
| D10 | 0 | 0 | 5.14681E−22 | 3.81958E−21 |

Optical parameters in this embodiment are shown below.

TABLE 2

Wave length, refractive index

| | | |
| --- | --- | --- |
| Working wave length (nm) | λ | 790 |
| Refractive index of scanning lenses 6 and 7 | Nd | 1.531 |
| Abbe number of scanning lenses 6 and 7 | νd | 55.5 |
| Refractive index of BD lens | Nd | 1.492 |
| Abbe number of BD lens | νd | 57.9 |

Polygon

| | | |
| --- | --- | --- |
| Number of surfaces | N | 6 |
| Circumscribed circle diameter (mm) | Φ | 40 |

Light beam angle

| | | |
| --- | --- | --- |
| Optical deflector incident angle in main scanning direction (degrees) | αm | 70 |
| Optical deflector incident angle in sub-scanning direction (degrees) | αs | 0 |
| Optical deflector maximum exit angle in main scanning direction (degrees) | θ | ±39.4 |
| Synchronization detection angle (degrees) | θbd | 54 |

Arrangement

| | | |
| --- | --- | --- |
| Deflecting surface to first surface of scanning lens on side of optical deflector (mm) | d01 | 30 |
| Thickness of scanning lens on side of optical deflector (mm) | d12 | 7.5 |
| Second surface of scanning lens on optical deflector side to third surface of scanning lens on side of surface to be scanned (mm) | d23 | 91 |
| Thickness of scanning lens on side of surface to be scanned (mm) | d34 | 5.5 |
| Fourth surface of scanning lens on side of surface to be scanned to first surface of dust-proof glass (mm) | d45 | 66 |
| Thickness of dust-proof glass (mm) | d56 | 1.8 |
| First surface of dust-proof glass to surface to be scanned (mm) | d67 | 64.7 |
| Focal length of scanning lens (mm) | fp | 227 |
| Converging degree of collimator Optical deflector to convergence point (mm) | r0 | 1.00E+30 |

The second scanning unit S2 includes a synchronization detection unit (hereinafter also referred to as a "synchronization detection optical system") 19b. The synchronization detection optical system 19b includes a synchronization detection optical element (hereinafter also referred to as a "synchronization detection lens" or "BD lens") 9b having refractive power at least in the main scanning direction, and a synchronization detection element (hereinafter also referred to as a "synchronization detection sensor" or "BD sensor") 10b. In front of the synchronization detection sensor 10b, there is disposed a slit (hereinafter also referred to as a "synchronization detection slit") 11b. Further, there is provided an optical path change unit (hereinafter also referred to as a "synchronization detection mirror") 13b which guides a light beam outside an effective image region on the surface to be scanned 8b to the synchronization detection sensor 10b.

The light source 1a and the synchronization detection sensor 10b of the synchronization detection optical system 19b are attached onto a circuit board 12a integrally. Thus, the number of components of the circuit board is reduced, the number of wirings to the control unit is reduced, and the area necessary for manufacturing is reduced, to thereby reduce the size of the entire apparatus. As a secondary effect of the integral attachment of the synchronization detection sensor 10b and the laser board 12a, the number of wiring nodes can be reduced. Therefore, noise can be reduced, and hence the apparatus with higher reliability can be realized.

The synchronization detection optical system 19b in this embodiment uses a signal from the synchronization detection sensor 10b so as to decide (control) write (synchronization) timing on the surface to be scanned 8a (8b) of the first or second scanning unit S1 (S2).

In the synchronization detection optical system 19b, the synchronization detection light beam deflected for scanning by the deflecting surface 5b (hereinafter referred to as a "synchronization detection light beam") is imaged on a surface of the synchronization detection slit 11b. Then, the synchronization detection slit 11b is scanned with the synchronization detection light beam in the main scanning cross section along with rotation of the optical deflector 5.

In addition, the deflecting surface 5b and the synchronization detection slit 11b have a conjugate relationship on the sub-scanning cross section, to thereby constitute an optical face tangle error compensation system for the deflecting surface 5b.

The synchronization detection slit 11b has a knife-like edge and measures incident timing of the light beam (BD light beam) entering onto the synchronization detection sensor 10b so as to determine write position of the image. In addition, the synchronization detection light beam is imaged on the surface of the synchronization detection slit 11b in the main scanning direction, but not on the surface of the synchronization detection slit 11b in the sub-scanning direction. Thus, the structure is realized in which sensitivity unevenness due to manufacturing error of the synchronization detection sensor 10b and sensitivity unevenness due to contaminants such as dust can be hardly generated.

In the scanning optical apparatus of this embodiment, one synchronization detection sensor 10b is disposed for the two scanning units S1 and S2, and image write timing determined by the synchronization detection sensor is used by both the scanning units S1 and S2.

Further, in this embodiment, the case where the one synchronization detection optical system 19b determines the write timing for the two scanning units S1 and S2 is described. However, the present invention is not limited thereto, and two synchronization detection optical systems may be used for determining write timings of the two scanning units S1 and S2, respectively. In other words, it is possible to adopt a structure in which synchronization detection optical systems are disposed independently for the scanning units S1 and S2, respectively. According to this structure, the synchronization detection timings (synchronizing signals) are independently detected for the scanning units S1 and S2, respectively, so that relative error between the two scanning units S1 and S2 can be also detected. Thus, more accurate detection and control of the write timing can be performed. In addition, the two scanning units S1 and S2 are structured so that light beams from the two light sources 1a and 1b enter the optical deflector 5 from the same direction.

Further, in this embodiment, the case where the two light sources 1a and 1b are used is described. However, the present invention is not limited thereto, and three or more light sources may be used.

In addition, a principal ray of the light beam emitted from the light source 1a (1b) enter the optical deflector 5 at an angle of 70 degrees with respect to the optical axis La (Lb) of the imaging optical system 15a (15b).

Note that, the principal ray of the light beam means a light beam that passes through the center of the aperture stop 2a (2b).

Next, an operation (optical action) of the scanning optical apparatus of this embodiment is explained.

In this embodiment, the light beam modulated optically in accordance with image information and emitted from the light source 1a (1b) in the first (second) scanning unit S1 (S2) is converted into a parallel light beam, or a weakly converging light beam or a weakly diverging light beam by the collimator lens 3a (3b). Then, the converted light beam enters the cylindrical lens 4a (4b). The light beam entering the cylindrical lens 4a (4b) passes through the aperture stop 2a (2b) as it is in the main scanning cross section.

On the other hand, in the sub-scanning cross section, the light beam passes through the aperture stop 2a (2b) and is converged, so as to form a line image (line image elongated in the main scanning direction) on the deflecting surface 5a (5b) of the optical deflector 5. Then, the light beam deflected for scanning by the deflecting surface 5a (5b) of the optical deflector 5 forms a spot-like image on the photosensitive drum surface 8a (8b) by the imaging optical system 15a (15b).

Then, the optical deflector 5 is rotated in the direction of the arrow A, so that the light beam passes through the imaging optical system 15a (15b) to scan the photosensitive drum surface 8a (8b) optically at a constant speed in the direction of the arrow B (main scanning direction). Thus, the image is recorded on the photosensitive drum 8a (8b) as the recording medium. Here, the main scanning directions on the surfaces to be scanned by the scanning unit S1 and the scanning unit S2 are opposing directions as illustrated in FIG. 1 by the arrows B, so as to form a so-called opposed scanning optical system.

In this case, before scanning the photosensitive drum surface 8a (8b) optically, the synchronization detection signal 19a is used for adjusting timing of the scanning start position on the photosensitive drum surface 8a (8b).

The synchronization detection light beam is a light beam portion outside the light beam for image formation (outside the image formation region) on the image write start side that is an "upstream side" in the direction B in which the image spot on the surface to be scanned 8a (8b) is moved.

In this embodiment, the light beam emitted from the light source 1b of the second scanning unit S2 is reflected by the synchronization detection mirror 13b. Then, the light beam is guided to the synchronization detection sensor 10b disposed on the laser board 12a, on which the light source 1a of the first scanning unit S1 is arranged and which is disposed to be opposed to the optical deflector 5.

Figure 2:
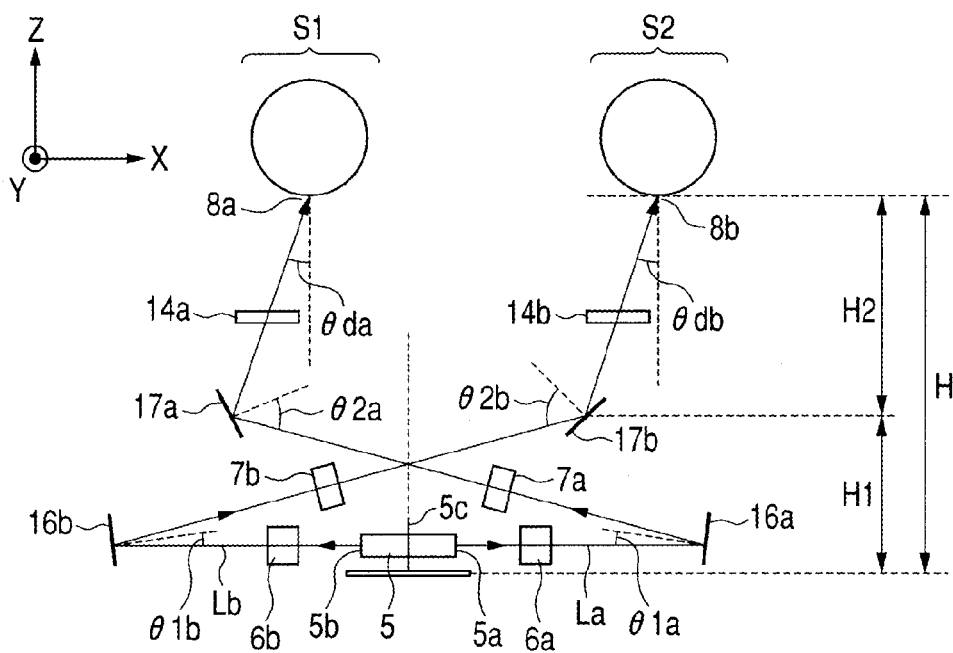
FIG. 2 is a schematic diagram of a main part of a sub-scanning cross section according to the first embodiment.

FIG. 2 is a main part cross sectional view in the sub-scanning direction (sub-scanning cross sectional view) of the scanning optical apparatus illustrated in FIG. 1, and is a diagram viewed from the positive direction to the negative direction of the Y axis in FIG. 1. FIG. 2 schematically illustrates the optical paths of the scanning units S1 and S2 in which the two on-axial light beams La and Lb are reflected and deflected by the two deflecting surfaces 5a and 5b of the optical deflector 5 and reach the corresponding surfaces to be scanned 8a and 8b, respectively.

Further, in the following description, the on-axial light beam means a light beam in the case where the angle between the optical axis La (Lb) of the imaging optical system 15a or 15b and the principal ray of the light beam reflected and deflected by the deflecting surface 5a or 5b of the optical deflector 5 is zero.

In this embodiment, two turn back mirrors (optical path change units) 16a and 17a (16b and 17b) are arranged in the optical path from the optical deflector 5 to the surface to be scanned 8a (8b).

Further, in the following description, in terms of the direction along the optical path from the deflecting surface 5a (5b) of the optical deflector 5 to the surface to be scanned 8a (8b), the turn back mirror that appears first is referred to as a first turn back mirror (first optical path change unit) 16a (16b). The turn back mirror that appears second is referred to as a second turn back mirror (second optical path change unit) 17a (17b).

In this embodiment, the light beam that enters the optical deflector 5 via the cylindrical lens 4a or 4b is set to be perpendicular to the rotational axis 5c of the optical deflector 5 in the sub-scanning cross section. As a result, the angle between the light beam just after being reflected and deflected by the deflecting surface 5a or 5b and the rotational axis 5c of the optical deflector 5 is also 90 degrees.

In addition, each of the scanning units S1 and S2 has two turn back mirrors for folding the optical path, so that a small size of the entire apparatus is realized.

The incident angle of the on-axial light beam La (hereinafter referred to as an on-axial incident angle) on the turn back mirror is as follows. The on-axial incident angle $\theta 1a$ on the first turn back mirror 16a of the scanning unit S1 is 7 degrees, and the on-axial incident angle $\theta 2a$ on the second turn back mirror 17a is 42 degrees. On the other hand, the on-axial incident angle $\theta 1b$ on the first turn back mirror 16b of the scanning unit S2 is 7 degrees, and the on-axial incident angle $\theta 2b$ on the second turn back mirror 17b is 62 degrees.

In addition, in this embodiment, in order to avoid a phenomenon that the light beam after passing through the scanning lens 6a (6b) and then reflected by the first turn back mirror enters the scanning lens 6a (6b) again, the scanning lens 6a (6b) is shifted by 1.5 mm with respect to the light beam height of the incident light beam (in the negative Z direction in the diagram). Thus, the on-axial incident angle on the first turn back mirror can be small, and hence the height H can be further reduced.

Figure 3:
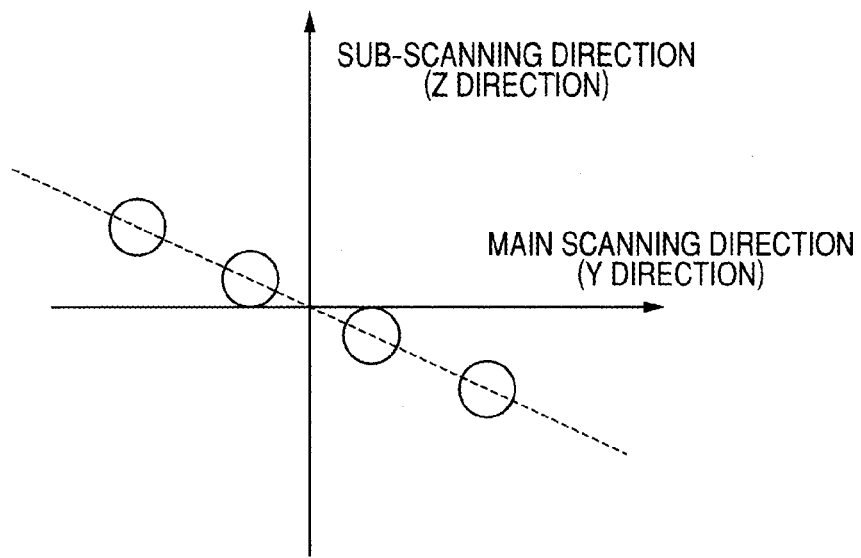
FIG. 3 is a schematic diagram of a main part of a light source unit according to the first embodiment.

FIG. 3 illustrates a schematic diagram of light-emitting points of the light source 1a of the scanning unit S1 according to this embodiment. In this embodiment, a monolithic four-beam laser including four light emission portions is used as the light source 1a (1b). In this case, the laser chip is inclined so that an interval between the light beams on the surface to be scanned 8a (8b) in the sub-scanning direction becomes a predetermined interval. In this embodiment, the laser chip is rotated by 3.92 degrees about the optical axis of the collimator lens so that a predetermined light beam interval of 21.2 μm (corresponding to 1200 dpi) is secured.

As described above, the scanning optical apparatus of this embodiment is structured.

Hereinafter, the illuminance distribution unevenness between the stations is described. Specifically, reduction of the illuminance distribution unevenness between the stations is described in consideration of an orientation angle change of the lens slow axis and laser polarization direction as factors for the illuminance distribution unevenness is described.

First, the orientation angle change of the lens slow axis is described.

In this embodiment, the scanning lenses 6a and 7a (6b and 7b) are molded lenses manufactured by a process of molding and curing plastic resin in a mold. The molded lens has a feature of easy mass production with low cost compared with a glass lens manufactured by a machining process including cutting and grinding steps. However, in the molding process of resin in a mold, it is very difficult to realize uniform crystal orientation over the entire lens, because the crystal orientation of the plastic resin changes due to temperature gradient and other conditions during resin curing in the manufacturing process. Therefore, compared with the glass lens manufactured by a machining process, the molded lens is affected largely by the birefringence. This is described with reference to FIGS. 4, 5A, and 5B.

Figure 4:
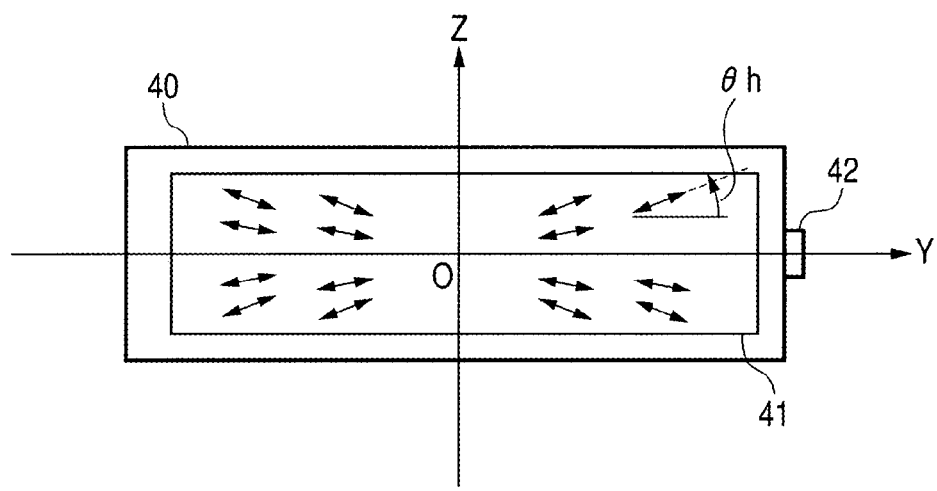
FIG. 4 is a schematic diagram illustrating an orientation angle of a molded lens according to the first embodiment.

FIG. 4 illustrates a schematic diagram of an orientation angle as a characteristic parameter of the birefringence in a typical molded lens. In the process of forming a lens 40 by the molding, plastic resin is supplied to a mold (not shown) through a gate part 42 so as to form a desired shape, and then the resin is cooled and cured so as to form the lens 40. A resin mold lens like this lens has birefringence property, and the orientation directions of the slow axis and the fast axis are not uniform. In other words, as illustrated in the diagram, the orientation direction is different between the main scanning direction (Y direction) and the sub-scanning direction (Z direction). In the diagram, the direction of the slow axis is indicated by the arrow (hereinafter, the orientation angle is indicated in the same manner as the angle of the slow axis with respect to the Y axis).

Figure 5A:
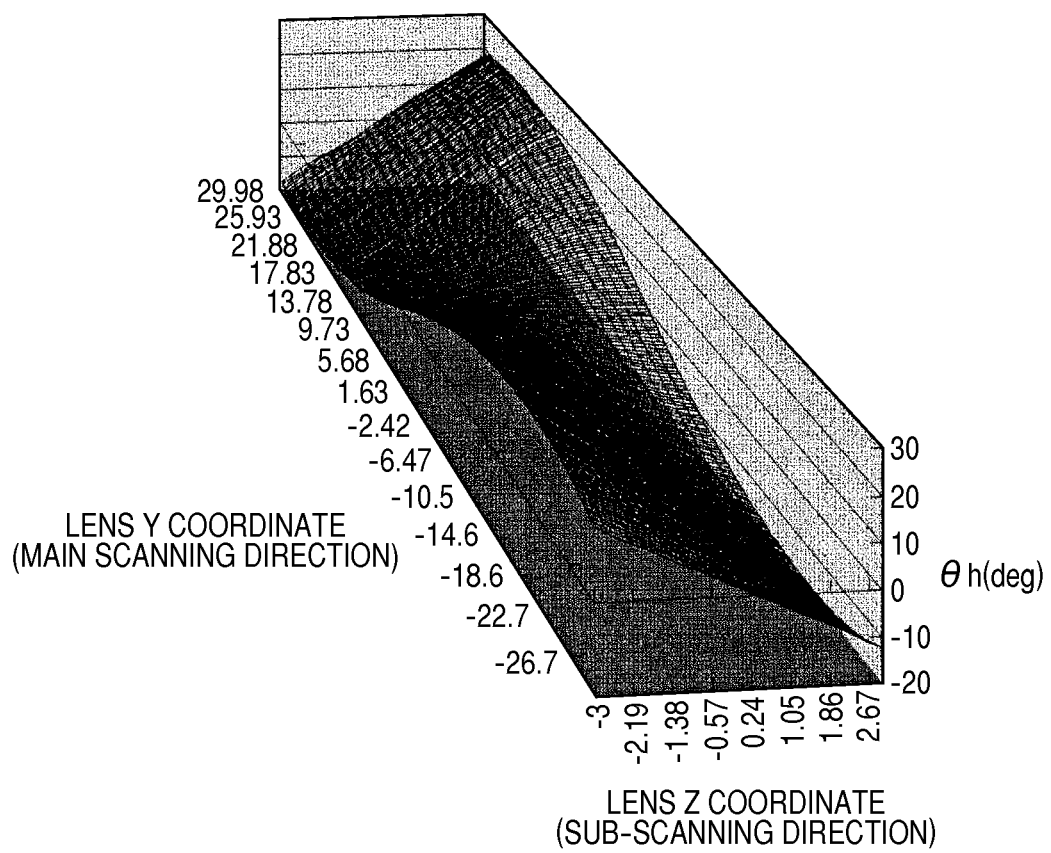
FIG. 5A is a graph illustrating the orientation angle of the molded lens according to the first embodiment three-dimensionally.
Figure 5B:
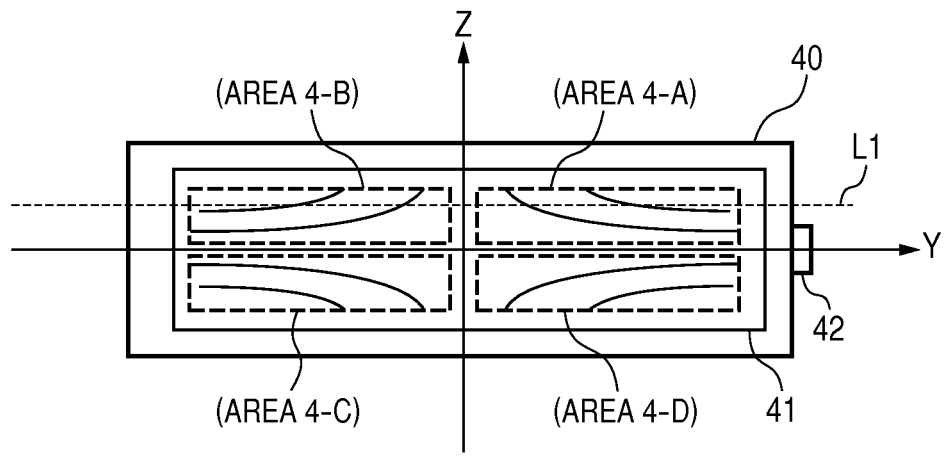
FIG. 5B is a graph illustrating the orientation angle of the molded lens according to the first embodiment with a contour diagram.

FIGS. 5A and 5B illustrate, as an example of direction distribution of the slow axis on the light incident surface of the molded lens, an angle (orientation angle) $\theta h$ between the Y axis positive direction (main scanning direction) and the slow axis of the scanning lens 6a. FIG. 5A illustrates the orientation angle $\theta h$ with respect to the Y coordinate (position in the main scanning direction) and the Z coordinate (position in the sub-scanning direction) as a three-dimensional graph. FIG. 5B illustrates the orientation angle $\theta h$ with respect to the Y coordinate (position in the main scanning direction) and the Z coordinate (position in the sub-scanning direction) two-dimensionally by using contour lines. The direction of the sign of $\theta h$ is defined as follows. If the slow axis exists in the counterclockwise direction from the Y axis positive direction when viewing the mirror surface part in the light beam propagation direction as illustrated in FIG. 4, the direction is defined as a positive direction.

As illustrated in FIGS. 5A and 5B, an absolute value of the orientation angle $\theta h$ is apt to increase along with an increase of an absolute value of the Z coordinate. In addition, the sign of the orientation angle $\theta h$ is reversed with respect to the Y axis, and further the sign of the orientation angle $\theta h$ is reversed with respect to the Z axis, too. In other words, the sign of the orientation angle $\theta h$ is the same between Area 4-A in which the Y coordinate and the Z coordinate have positive values and Area 4-C in which the Y coordinate and the Z coordinate have negative values. In addition, on the other hand, the sign of the orientation angle $\theta h$ is the same between Area 4-B in which the Y coordinate has a negative value while the Z coordinate has a positive value and Area 4-D in which the Y coordinate has a positive value while the Z coordinate has a negative value, and the sign of the orientation angle $\theta h$ is different from that in Area 4-A and in Area 4-D (hereinafter, referred to as a "saddle type orientation angle distribution").

In the molding process, the crystal orientation distribution is apt to appear clearly as thickness of the molded article is larger, due to the temperature gradient in the melted plastic resin that is being cured. Therefore, optical characteristic of the molded lens is affected more by the birefringence property as the thickness thereof is larger. Therefore, in this embodiment, the present invention is applied to the scanning lens 6a (6b) having a largest thickness of the thickest part among the scanning lenses in the scanning unit S1 (S2).

Figure 6:
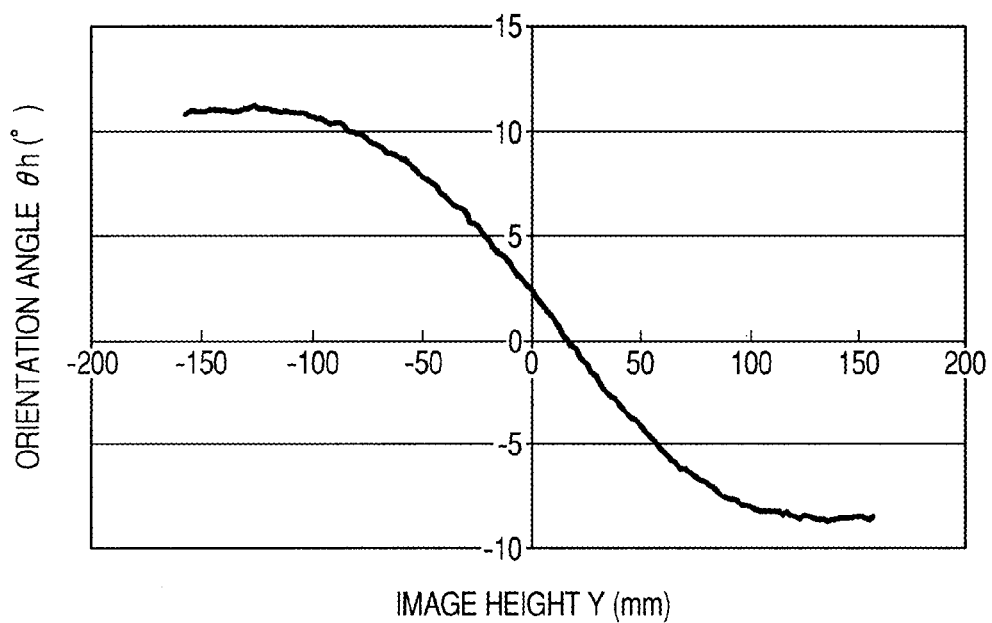
FIG. 6 is a graph of an orientation angle θh of a scanning unit S1 according to the first embodiment.

In this embodiment, the scanning lens 6a (6b) is shifted in the negative direction of the sub-scanning direction (Z direction) by 1.5 mm for use. Therefore, the light beam passes through a position on a line L1 that is shifted from the center in the Z direction of the effective region of the scanning lens 6a (6b) by 1.5 mm in the positive direction of the Z axis. FIG. 6 illustrates a graph showing a relationship between the orientation angle θh and the Y coordinate (image height) on the scanning lens 6a (6b) on the line L1. The orientation angle θh changes approximately 11 degrees at most with respect to the on-axial light beam having the image height Y=0 mm.

Next, influence on the illuminance distribution on the surface to be scanned in the polarization direction of the light beam (laser light) from the light source is described. In this embodiment, the monolithic four-beam laser described above is used, and the laser light-emitting point chip is rotated about the optical axis of the collimator lens (hereinafter referred to as a laser rotation angle θr) so that a predetermined sub-scanning interval is secured on the surface to be scanned. Before describing influence of the laser rotation angle θr, a laser polarization state in the state without the laser rotation is first described below.

Figure 7A:
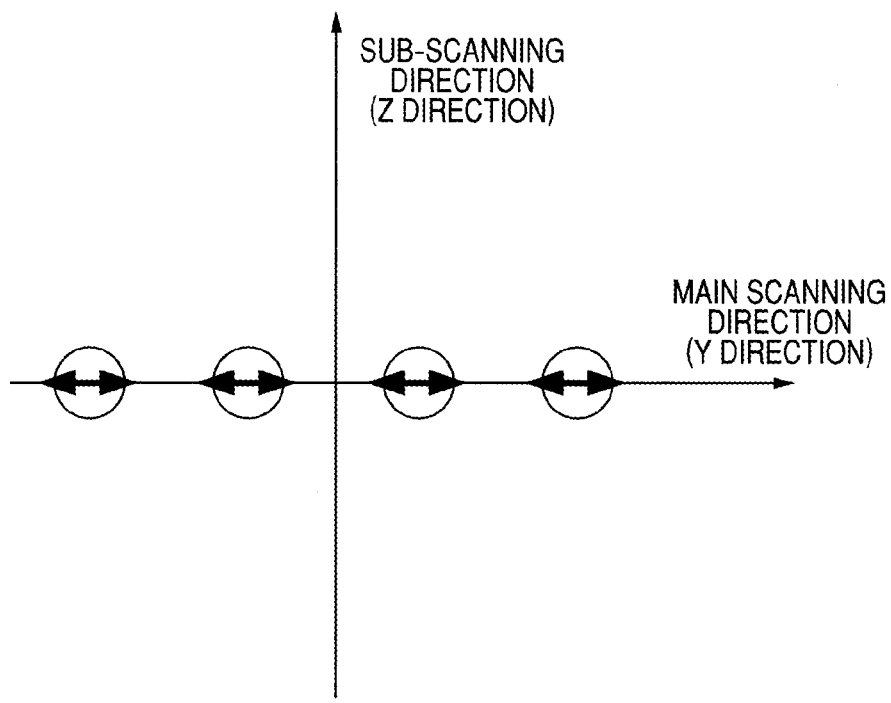
FIG. 7A is a schematic diagram illustrating a laser polarization direction of the scanning unit S1 according to the first embodiment (in the case of being parallel to the main scanning direction).

If the laser rotation angle θr is 0 degrees, the light beam from the light source 1a (1b) enters the deflecting surface 5a (5b) with P polarization, and enters the first turn back mirror 16a (16b) and the second turn back mirror 17a (17b) so that the polarization direction of the laser light beam becomes the linear polarization of the S polarization state as for only the on-axial light beam of the imaging lens 15a (15b). FIG. 7A is a schematic diagram illustrating the linear polarization direction viewed from the light source 1a side of the scanning unit S1 to the optical deflector 5. In order to form the P polarization with respect to the deflecting surface 5a, the oscillation direction of the laser linear polarization indicated by the arrow marks in the diagram is the same as the main scanning direction (Y direction). Hereinafter, an angle between the oscillation direction of the laser linear polarization and the Y axis is referred to as a "laser polarization angle θr'".

Figure 7B:
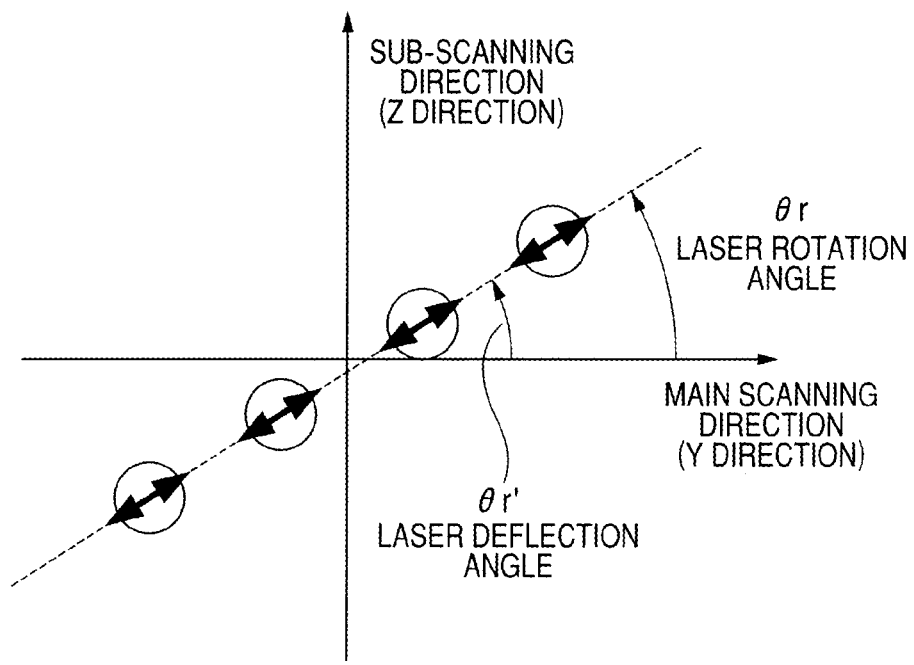
FIG. 7B is a schematic diagram illustrating a laser polarization direction of the scanning unit S1 according to the first embodiment (in the case of being inclined to the main scanning direction).

FIG. 7B illustrates an example of a laser polarization state in the case where the laser light-emitting point chip is rotated about the optical axis of the collimator lens, namely in the case where the laser rotation angle θr is not 0 degrees. As can be seen from the diagram, the oscillation direction of the laser linear polarization in the case where the laser rotation θr is performed is also inclined with respect to the main scanning direction (Y axis) by θr. Here, the sign of the laser rotation angle θr is defined that the counterclockwise direction is positive when viewing the deflection surface from the light source side. The laser rotation angle θr in the scanning unit S1 is set to be −3.92 degrees.

Figure 8:
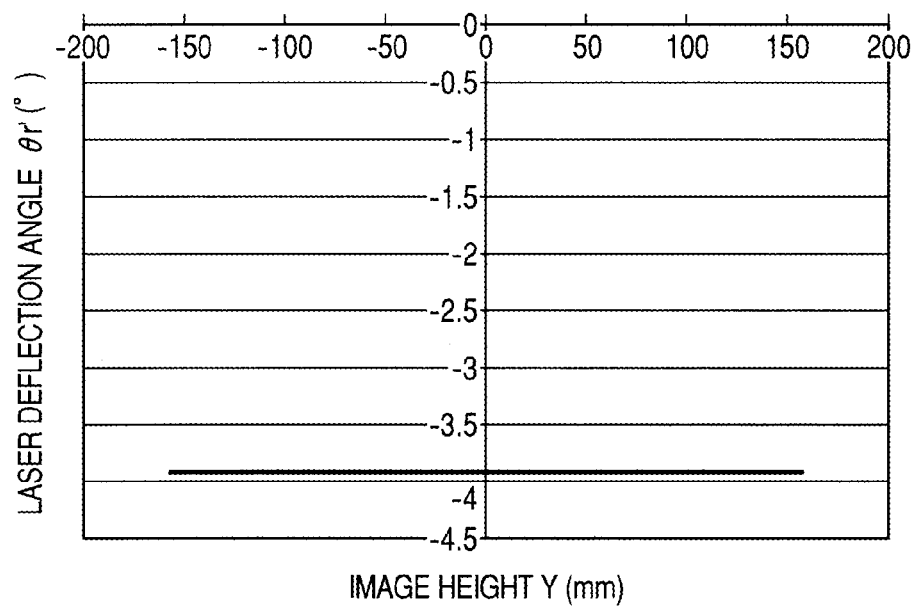
FIG. 8 is a graph of a laser polarization angle θr' of the scanning unit S1 according to the first embodiment.

In this way, the laser polarization angle θr' of each of the four laser beams emitted with linear polarization is changed by the laser rotation angle θr as described above. As a result, the polarization direction of the laser beam reaching the scanning lens 6a (6b) via the deflecting surface 5a (5b) of the optical deflector 5 is also changed. FIG. 8 illustrates a relationship between the laser polarization angle θr' and the Y coordinate (image height) on the scanning lens 6a in this embodiment. As illustrated in FIG. 8, the laser polarization angle θr' on the scanning lens 6a has a constant value θr'=−3.92 degrees regardless of the Y coordinate (image height). Note that, the laser polarization angle θr' is an angle between the polarization direction of the laser beam reaching the lens via the deflecting surface 5a (5b) and the longitudinal direction of the scanning lens (Y axis or main scanning direction). In addition, as to a sign of the laser polarization angle θr', the direction in which the light beam is directed to the surface to be scanned from the Y axis positive direction corresponding to the positive direction of the image height is set to be positive.

Hereinafter, the influence on the illuminance distribution unevenness caused by the two parameters that are the lens orientation angle θh and the laser polarization angle θr' is described.

Figure 9:
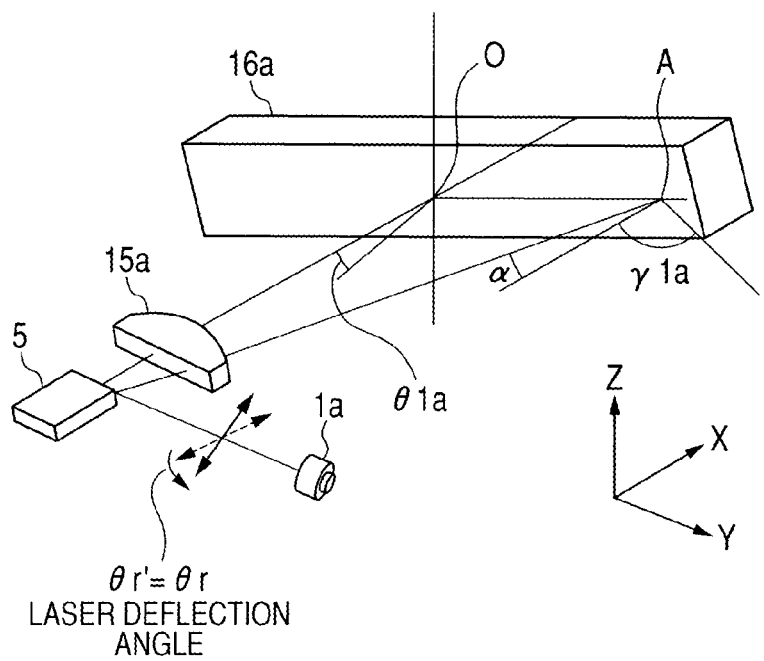
FIG. 9 is a schematic diagram illustrating an incident state of a laser deflection according to the first embodiment.

FIG. 9 is an explanatory diagram of the incident state of the laser light beam to the first turn back mirror 16a. Note that, only the first turn back mirror 16a is described below because the same description can be applied to other mirrors.

In FIG. 9, the plane including the x axis and the y axis is illustrated as the main scanning cross section. It is supposed that the light beam for scanning scans the surface of the first turn back mirror 16a from a point O toward a point A with an angle α (degrees) with respect to the x axis (the same direction as the on-axial light beam).

As illustrated in FIG. 9, the incident angle γ1a (degrees) with respect to the first turn back mirror 16a is changed by the scanning angle of view α (degrees) and is expressed by the following equation using the incident angle θ1a (degrees) of the on-axial light beam with respect to the first turn back mirror 16a.

$$\gamma 1a[°]=\cos^{-1}(\cos\alpha\cdot\cos\theta 1a)[°] \quad (1)$$

In addition, as illustrated in FIG. 9, if the laser light beam enters the first turn back mirror 16a with the laser polarization angle θr', a ratio of polarization components of the off-axial light beam is as follows. A ratio $Ep^2$ of the P polarization intensity and a ratio $Es^2$ of the S polarization intensity are expressed by Equations below.

$$Ep^2 = \frac{\left(\sin(\theta h - \theta r') - \frac{\sin\alpha\cdot\cos(\theta h - \theta r')}{\tan\theta 1a}\right)^2}{\cos^2\alpha\cdot\left(\tan^2\alpha + 1 + \left(\frac{\tan\alpha}{\tan\theta 1a}\right)^2\right)} \quad (2)$$

$$Es^2 = 1 - Ep^2 \quad (3)$$

In addition, in any incident angle γ1a (degrees) from the on-axial light beam to the off-axial light beam entering the turn back mirror, reflectance Rg(γ1a) (%) of the turn back mirror is expressed by the following equation. Here, Rs(γ1a) (%) denotes the S polarization reflectance, and Rp(γ1a) (%) denotes the P polarization reflectance at any incident angle γ1a (degrees).

$$Rg(\gamma 1a)=Es^2\cdot Rs(\gamma 1a)+Ep^2\cdot Rp(\gamma 1a) \quad (4)$$

Figure 10:
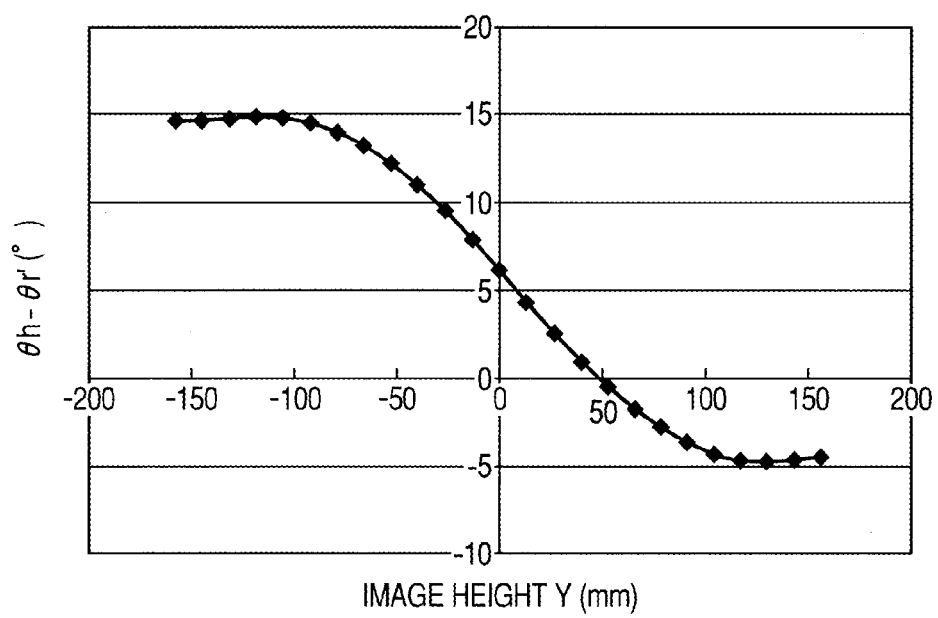
FIG. 10 is a graph of (θh−θr') of the scanning unit S1 according to the first embodiment.
Figure 11:
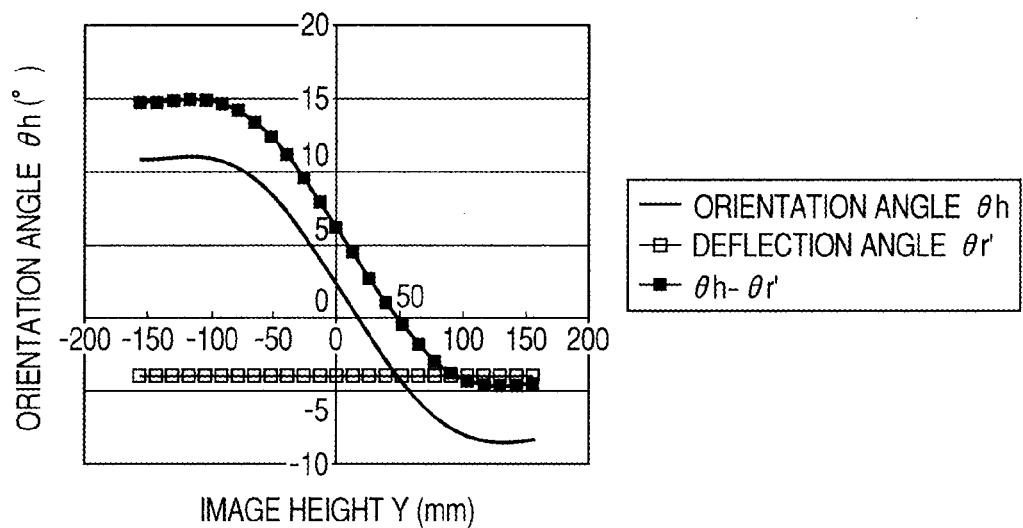
FIG. 11 is a graph of θh and θr' of the scanning unit S1 according to the first embodiment.

As understood from the equation (4), if the reflectance values Rs(γ1a) and Rp(γ1a) of the S and P polarization components are different from each other, total reflectance Rg(γ1a) of the S and P polarization components varies when the ratios $Es^2$ and $Ep^2$ of the S and P polarization components vary. In other words, it is understood that (θh−θr') in the above equation (2) affects light amount distribution after passing through the lens. FIG. 10 illustrates (θh−θr') in the scanning unit S1 of this embodiment, and FIG. 11 illustrates a relationship between θh and θr'.

Figure 12A:
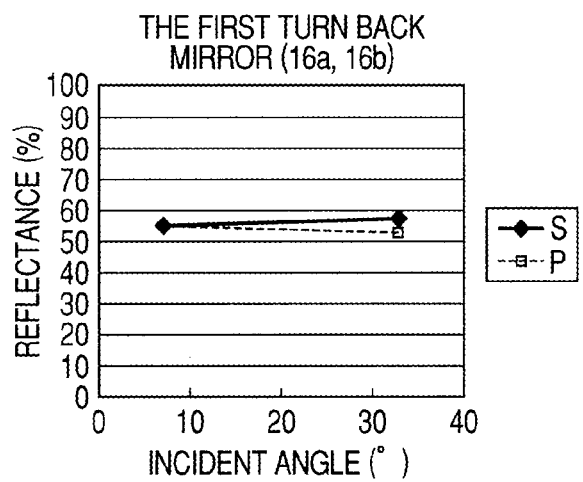
FIG. 12A is a graph of reflectance for S and P polarized light of a turn back mirror according to the first embodiment (first turn back mirror (16a or 16b)).
Figure 12B:
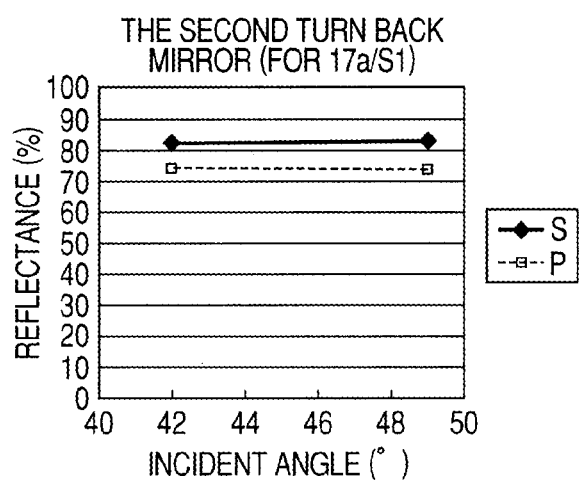
FIG. 12B is a graph of reflectance for S and P polarized light of a turn back mirror according to the first embodiment (second turn back mirror (17a for S1)).
Figure 12C:
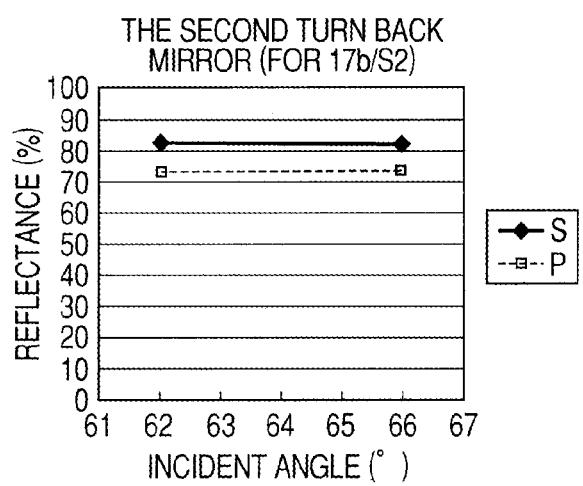
FIG. 12C is a graph of reflectance for S and P polarized light of a turn back mirror according to the first embodiment (second turn back mirror (17b for S2)).

In addition, FIGS. 12A, 12B, and 12C illustrate the reflectance values Rs(γ1a) (%) and Rp(γ1a) (%) for the S and P polarization components of the turn back mirrors arranged in the scanning units S1 and S2 in this embodiment. FIG. 12A illustrates the reflectance values Rs(γ1a) and Rp(γ1a) of the first turn back mirrors (16a and 16b) for the S and P polarization components, FIG. 12B illustrates the reflectance values Rs(γ1a) and Rp(γ1a) of the second turn back mirror (for 17a/S1) for the S and P polarization components, and FIG. 12C illustrates the reflectance values Rs(γ1a) and Rp(γ1a) of the second turn back mirror (for 17b/S2) for the S and P polarization components.

Figure 13:
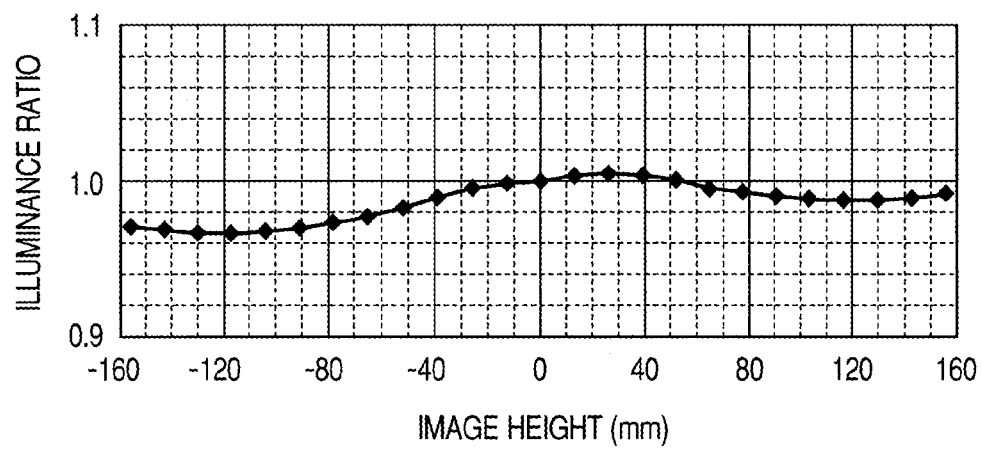
FIG. 13 is a graph showing illuminance distribution of the scanning unit S1 according to the first embodiment.

FIG. 13 illustrates the illuminance distribution on a drum surface (surface to be scanned) 8a of the scanning unit S1, which is determined on the basis of the equations (1) to (4) and FIGS. 11, 12A, 12B, and 12C and is normalized by the value at the image height 0 mm.

It is understood that the illuminance distribution is within 4% with respect to the image height 0 mm in the entire image height.

Hereinafter, the rotation direction of the laser of the light source 1b of the scanning unit S2 for decreasing a difference of the illuminance distribution between the scanning unit S1 and the scanning unit S2 is described on the assumption that a monolithic four-beam laser having the same standard as the light source 1a of the scanning unit S1 is used for the light source 1b of the scanning unit S2. Specifically, it is necessary to adjust the light beam interval in the sub-scanning direction on the surface to be scanned 8a (8b) to be a predetermined interval between the scanning units S1 and S2. Therefore, the laser rotation angle of the scanning unit S2 is compared between the case of the same sign and the case of different signs with the same size as the laser rotation angle in the scanning unit S1.

The illuminance distribution unevenness on the surface to be scanned is described below, which is obtained in the case where the laser rotation angle θr of the scanning unit S2 is set to have the same value and the same sign as the laser rotation angle of the scanning unit S1.

Figure 14:
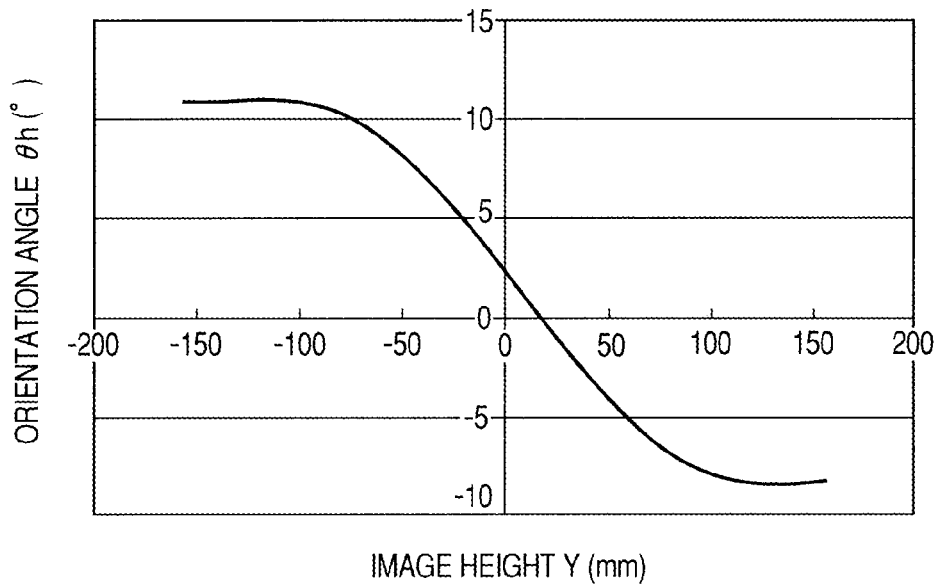
FIG. 14 is a graph of the orientation angle θh of a scanning unit S2 according to the first embodiment.

As illustrated in FIG. 1, the scanning lenses 6b and 7b of the scanning unit S2 are set at positions obtained by rotating the scanning lenses 6a and 7a of the scanning unit S1 in the plane including the axis of the optical deflector about a line L0 parallel to the Y axis by 180 degrees. FIG. 14 illustrates the orientation angle θh of the scanning lens in the scanning unit S2.

In addition, the laser rotation angle θr of the scanning unit S2 in this comparison example is defined similarly to that illustrated in FIGS. 7A and 7B to be θr=−3.92 degrees that is the same as the laser rotation angle in the scanning unit S1.

Figure 15:
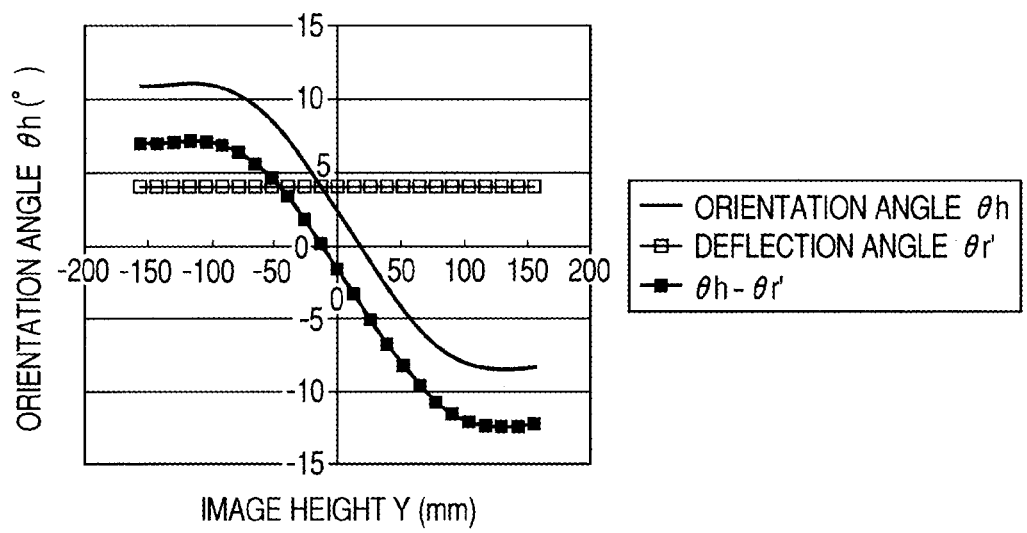
FIG. 15 is a graph of θh and θr' in the case where a laser rotation angle of the scanning unit S2 is −3.92 degrees in the device structure of the first embodiment.

Here, FIG. 15 illustrates a relationship between the lens orientation angle θh and the laser polarization angle θr' in the scanning unit S2 when the laser rotation angle θr is set to −3.92 degrees similarly to the case of the scanning unit S1.

As understood from FIG. 15, the laser polarization angle θr' on the lens becomes θr'=+3.92 degrees after the value is reversed because the scanning unit is on the opposite side of the scanning unit S1 described above.

Note that, the laser polarization angle θr' is an angle between the polarization direction of the laser beam reaching the scanning lens 6b via the deflecting surface 5a (5b) and the longitudinal direction of the scanning lens (Y axis or main scanning direction) similarly to the scanning unit S1. In addition, as to the sign of θr', the positive direction from the Y axis corresponding to the positive direction of the image height toward the region used by the light beam is set to be positive.

Figure 16:
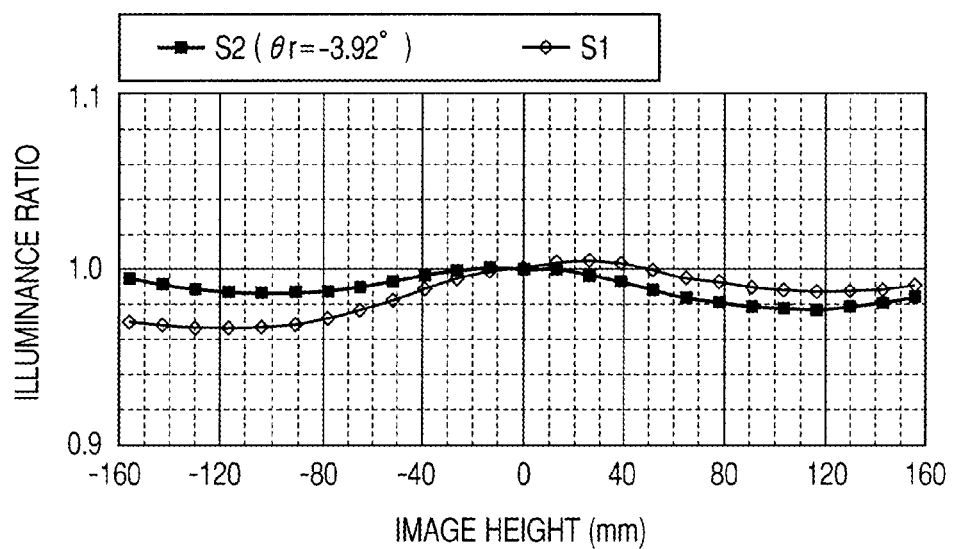
FIG. 16 is a graph showing illuminance distribution in the case where a laser rotation angle of the scanning unit S2 is −3.92 degrees in the device structure of the first embodiment.

Similarly to the case of the scanning unit S1, FIG. 16 illustrates the illuminance distribution on the drum surface (surface to be scanned) 8b of the scanning unit S2, which is determined on the basis of the equations (1) to (4) and FIGS. 12A, 12B, 12C, and 15. In the illuminance distributions of the scanning unit S1 and the scanning unit S2, there is an illuminance difference of 2.4 points at most at the image height Y=−156 mm (difference between 97.0% in the scanning unit S1 and 99.4% in the scanning unit S2). Next, illuminance distribution unevenness on the surface to be scanned is described below, which is obtained in the case where the laser rotation angle θr of the scanning unit S2 is set to 3.92 degrees that is the same angle with different sign from the laser rotation angle of the scanning unit S1.

Figure 17:
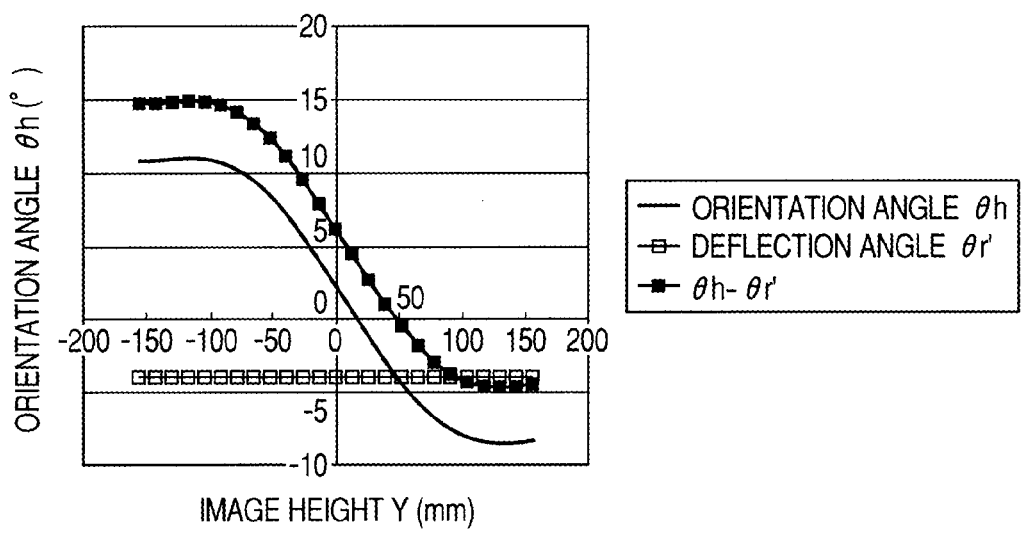
FIG. 17 is a graph of θh and θr' of the scanning unit S2 according to the first embodiment.

FIG. 17 illustrates a relationship between the lens orientation angle θh and the laser polarization angle θr' on the scanning lens 6b of the scanning unit S2 in the case where the laser rotation angle of the scanning unit S2 determined similarly to the case of the scanning unit S1 is 3.92 degrees.

As understood from FIG. 17, the laser polarization angle θr' on the scanning lens 6b becomes θr'=−3.92 degrees because the value is reversed due to a scanning unit that is rotationally symmetric with the scanning unit S1 described above by 180 degrees, and because the laser polarization direction θr' is also reversed.

Further, similarly to the case of the scanning unit S1, the laser polarization angle θr' is an angle between the polarization direction of the laser beam reaching the lens via the deflecting surface 5b and the lens longitudinal direction (Y axis direction), in which the counterclockwise direction toward the light propagation direction is set to be positive.

Figure 18:
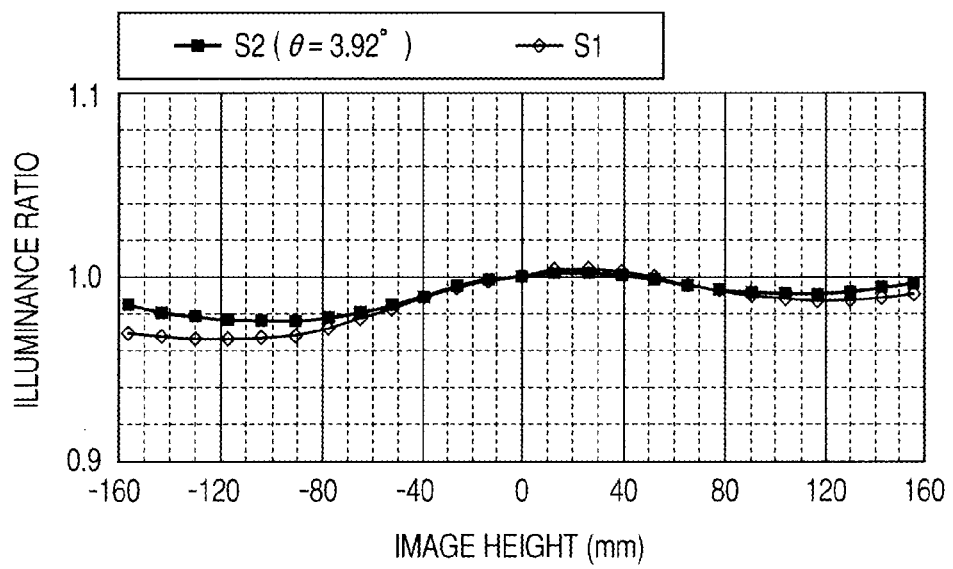
FIG. 18 is a graph showing illuminance distribution of the scanning unit S2 according to the first embodiment.

FIG. 18 illustrates the illuminance distribution on the drum surface of the scanning unit S2 in the case where the laser rotation angle of the scanning unit S2 determined on the basis of the equations (1) to (4) and FIGS. 12A, 12B, 12C, and 17 is 3.92 degrees.

As understood from this result, in the illuminance distributions of the scanning unit S1 and the scanning unit S2, there is an illuminance difference of 1.4 points at most at the image height Y=−156 mm (difference between 97.0% in the scanning unit S1 and 98.4% in the scanning unit S2). In other words, the illuminance difference can be reduced to approximately a half with respect to the maximum illuminance difference 2.4 points in the case where the laser rotation angle of the scanning unit S2 is −3.92 degrees.

In the case where the laser rotation angle of the scanning unit S2 is −3.92 degrees, compared with that of 3.92 degrees a difference of the illuminance distribution between the scanning units S1 and S2 is large. This is because the absolute value of the value (θh−θr') is largely different for each image height. Specifically, the value (θh−θr') at the image height Y=+156 mm is −4 degrees in the scanning unit S1, while the value (θh−θr') is −12 degrees in the scanning unit S2 at the laser rotation angle of −3.92 degrees and is −4 degrees in the scanning unit S2 at the laser rotation angle of 3.92 degrees. Because of this difference, there is generated a difference of the ratio of P polarization intensity expressed by the equation (2). As a result, there is generated a difference of the illuminance distribution between the scanning units expressed by the equation (4).

As a summary of the above discussion, the illuminance difference at the same image height between the scanning units can be reduced by controlling a difference of (θh−θr') at the same image height not to be large between the scanning units S1 and S2.

In other words, as in this embodiment, in the case where the scanning units S1 and S2 have the light source of the same specification, and an absolute value of the laser rotation angle is restricted so that a beam interval on the surface to be scanned in the sub-scanning direction takes a predetermined value, when the orientation angles of the scanning units S1 and S2 are denoted by $\theta 1h(y)$ and $\theta 2h(y)$ that are defined as functions of each position y in the Y axis direction with the origin of the Y axis being an intersection of the X-Z plane including the optical axis (plane perpendicular to the Y axis) and the Y axis where the direction in which the drum surface (the surface to be scanned) $8a$ is scanned with the light beam from the light source $1a$ in the main scanning direction is defined as a positive direction of the Y axis, and when the polarization angles of the incident light beam on the lens in the scanning units S1 and S2 are denoted by $\theta 1r$ and $\theta 2r$, respectively, the laser rotation angle satisfying the expression below is selected at the image height Y1min (Y coordinate value) where the lens orientation angle $\theta 1h(y)$ becomes minimum.

$Y1\text{min} \times \theta 2r > 0$, in the case where i $Y1\text{min} \times \theta 1r > 0$ is satisfied; and $Y1\text{min} \times \theta 2r < 0$, in the case where $Y1\text{min} \times \theta 1r < 0$ is satisfied. (5)

Thus, a difference in $(\theta h - \theta r')$ can be reduced between the scanning units S1 and S2, to thereby reduce a difference in illuminance distribution between the scanning units.

Specifically, in this embodiment, the laser rotation angle $\theta r$ of the scanning unit S2 is rotated in the direction opposite to the laser rotation angle of the scanning unit S1, and the laser polarization angle $\theta r'$ is also set in the opposite direction to the scanning unit S1. As a result, the orientation angle $\theta h$ of the scanning lens is in the direction so that the absolute values of $(\theta h - \theta r')$ agree also in the opposed scanning system like this embodiment in which the absolute value is reversed between the scanning unit S1 and the scanning unit S2.

As a summary of the above discussion, also in the case like this embodiment in which the orientation angle of the polarization direction of the lens material is changed on the lens through which the light beam deflected for scanning passes through, the illuminance distribution unevenness between the scanning units can be reduced by setting the laser polarization direction appropriately between the scanning units.

In this embodiment, the multi-beam light source is used as the light sources $1a$ and $1b$, but the present invention is not limited to this structure. The same effect can be obtained also in the case where a single beam light source is used with the polarization direction thereof inclined.

In other words, if it can be determined in advance that the polarization direction of the single beam light source is inclined in a certain constant direction due to a manufacturing factor, the attachment direction of the laser may be changed for each station so that the laser polarization direction satisfies the equation (5).

In this embodiment, only the imaging optical systems $15a$ and $15b$ and surface reflection (Fresnel reflection) components of the dust-proof glasses $14a$ and $14b$ are considered. However, in the actual case, there are image surface illuminance unevenness generated by incident angle characteristic of the deflecting surface of the optical deflector or a difference of diffraction efficiency of the diffraction optical elements, and image surface illuminance unevenness due to internal absorption of the imaging optical systems $15a$ and $15b$. Further, there are image surface illuminance unevenness generated when an overfilled optical system (OFS) is used, and other image surface illuminance unevenness. Those image surface illuminance unevenness can be also corrected.

In addition, two turn back mirrors are disposed in the optical path in this embodiment, but three or more turn back mirrors may be arranged. In addition, there may be used a reflection optical element (curved surface mirror) having refractive power like a cylindrical mirror.

When the scanning optical apparatus of this embodiment is used for the image forming apparatus which forms a two-color image, it is sufficient to use only one scanning optical apparatus. When a color image forming apparatus which forms a four-color image is used, two scanning optical apparatuses of this embodiment should be used for forming the image as described later.

In addition, each of the scanning lenses $15a$ and $15b$ is constituted of two lenses in this embodiment, but may be constituted of one lens or three or more lenses.

In addition, this embodiment describes the case where the optical deflector 5 (polygon mirror) has six deflecting surfaces. However, the present invention is not limited thereto, and the same effect can be obtained as long as the number of the deflecting surfaces is three or larger (e.g., four, five or seven surfaces).

Further, a rotational polygon mirror is used as the deflecting unit 5 in this embodiment, but a reciprocating type (oscillation type) deflecting element having mirror surface parts on both surfaces may be used, in which the deflecting surface $5a$ moves in a reciprocating manner about the axis $5b$ as a rotation axis so that the light beams are reflected and deflected (deflected for scanning) toward the surfaces to be scanned $8a$ and $8b$.

Further, the two incident light beams enter the deflecting surfaces $5a$ and $5b$ that are not adjacent to each other from the same direction in this embodiment. However, the present invention is not limited thereto, and the same effect can be obtained also in the case of different incident directions or the case where the light beams enter the deflecting surfaces that are adjacent to each other.

In addition, the deflector 5 is rotated in the clockwise direction in this embodiment. However, the present invention is not limited thereto, and the same effect can be obtained also in the case in which the deflector 5 is rotated in the counter-clockwise direction. However, in this case too, there should be used as the BD light beam, a part outside the light beam for image formation on the "upstream side" with respect to the direction B in which the imaging spot moves on the surfaces to be scanned $8a$ and $8b$, namely on the image write start side.

In the molding process, temperature gradient during curing affects largely on the formed crystal orientation. Therefore, a position of the gate part through which the melted resin is injected into the mold is important. Therefore, it is preferred that the positions of the gate parts of the scanning lenses $6a$ and $6b$ (scanning lenses $7a$ and $7b$) that are formed in the molding process with respect to the optical axis position are the same positions in the Y axis direction and in the optical axis directions of the scanning units S1 and S2.

Second Embodiment

Figure 19:
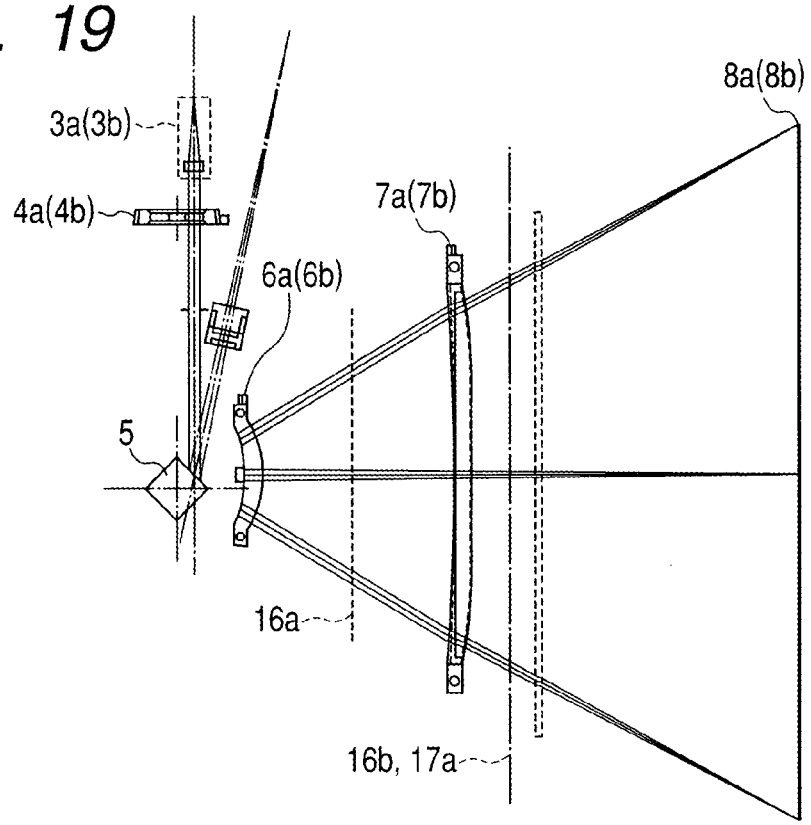
FIG. 19 is a schematic diagram of a main part of a main scanning cross section according to a second embodiment of the present invention.
Figure 20:
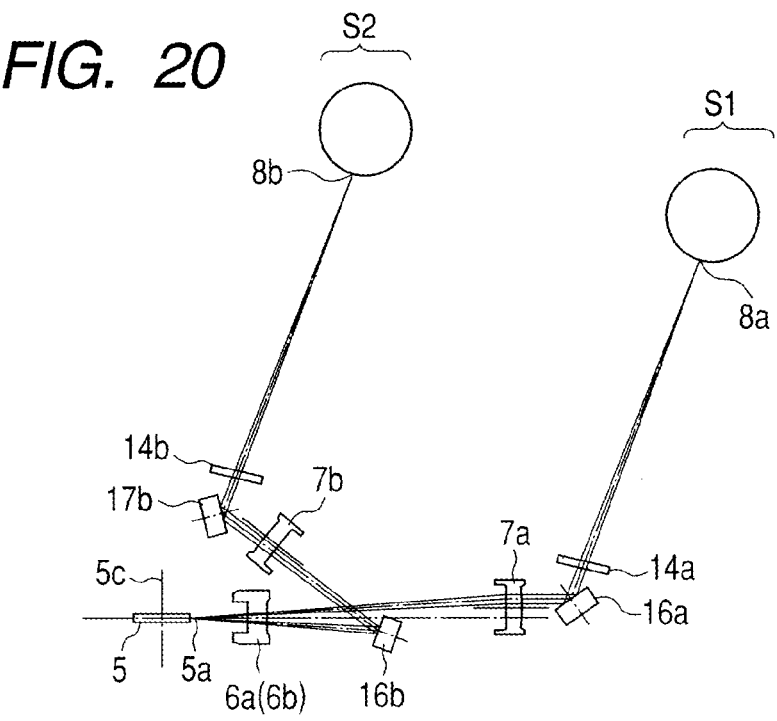
FIG. 20 is a schematic diagram of a main part of a sub-scanning cross section according to the second embodiment.

Hereinafter, a structure of a scanning optical apparatus of a second embodiment of the present invention is described with reference to FIGS. 19 and 20. FIG. 19 is a main scanning cross section of the scanning optical apparatus according to the second embodiment, and FIG. 20 is a sub-scanning cross section of the same.

In the second embodiment, the light beam enters the deflecting surface $5a$ obliquely in the sub-scanning cross section (oblique incident method), which is different from the first embodiment. In addition, unlike the first embodiment in which the two different surfaces of the one deflecting unit are used simultaneously, the second embodiment has a structure in which the light beam from the first optical element (3a) and the light beam from the second optical element (3b) enter the same deflecting surface 5a from the lower direction and the upper direction, respectively, with respect to the main scanning cross section in the sub-scanning direction (one side scanning system). The action of each optical element is the same as that in the first embodiment, and hence description thereof is omitted.

The following table shows parameters indicating lens surface shapes of the scanning lens 6a (6b) (scanning lens on the side of optical deflector) and the scanning lens 7a (7b) (scanning lens on the side of surface to be scanned) in this embodiment. In the description in the table, the scanning start side means the region on the upper side of the optical axis in FIG. 19, and the scanning end side means the region on the lower side of the optical axis. As shown in the table, the exit surface (second surface) of the scanning lens 6 and the incident surface (third surface) of the scanning lens 7 have different shapes in the main scanning cross section on the scanning start side and the scanning end side.

TABLE 3

Scanning lens surface shape on side of optical deflector

| | First surface | | Second surface | |
|---|---|---|---|---|
| | Scanning start side (s) | Scanning end side (e) | Scanning start side (s) | Scanning end side (e) |
| R | −3.96E+01 | −3.96E+01 | −2.76E+01 | −2.76E+01 |
| K | 1.52E+00 | 1.52E+00 | −2.82E+00 | −2.82E+00 |
| B4 | 1.08456E−05 | 1.08456E−05 | −1.02704E−05 | −9.42E−06 |
| B6 | 2.34983E−08 | 2.34983E−08 | 2.99E−08 | 2.35E−08 |
| B8 | −1.53415E−10 | −1.53415E−10 | −7.16E−11 | −5.16E−11 |
| B10 | 2.09039E−13 | 2.09039E−13 | 6.07E−15 | −1.78E−14 |
| R | −1.00E+03 | −1.00E+03 | −1.00E+03 | −1.00E+03 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

Scanning lens surface shape on side of surface to be scanned

| | Third surface | | Fourth surface | |
|---|---|---|---|---|
| | Scanning start side (s) | Scanning end side (e) | Scanning start side (s) | Scanning end side (e) |
| R | −1.03E+03 | −1.03E+03 | 9.70E+02 | 9.70E+02 |
| K | −8.81E+02 | −8.81E+02 | 2.02E+02 | 2.02E+02 |
| B4 | −1.40E−07 | 4.25E−08 | −6.28E−07 | −6.28E−07 |
| B6 | 1.19E−11 | −6.11E−11 | 5.98E−11 | 5.98E−11 |
| B8 | 8.57E−16 | 8.17E−15 | −2.75E−15 | −2.75E−15 |
| B10 | 1.62E−20 | 2.27E−19 | −2.08E−19 | −2.08E−19 |
| R | 1.71E+02 | 1.71E+02 | −2.83E+01 | −2.83E+01 |
| D2 | 0 | 0 | 1.40E−04 | 1.40E−04 |
| D4 | 0 | 0 | −2.78E−08 | −2.78E−08 |
| D6 | 0 | 0 | 3.36E−12 | 3.36E−12 |
| D8 | 0 | 0 | 7.11E−17 | 7.11E−17 |
| D10 | 0 | 0 | −1.46E−20 | −1.46E−20 |

Optical parameters are shown in the table below.

TABLE 4

| Wave length, refractive index | | |
|---|---|---|
| Working wave length (nm) | λ | 790 |
| Refractive index of scanning lenses 6 and 7 | Nd | 1.531 |
| Abbe number of scanning lenses 6 and 7 | νd | 55.5 |
| Refractive index of BD lens | Nd | 1.492 |
| Abbe number of BD lens | νd | 57.9 |
| Polygon | | |
| Number of surfaces | n | 4 |
| Circumscribed circle diameter (mm) | Φ | 20 |
| Light beam angle | | |
| Optical deflector incident angle in main scanning direction (degrees) | αm | 90 |
| Optical deflector incident angle in sub-scanning direction (degrees) | αs | 3 |
| Optical deflector maximum exit angle in main scanning direction (degrees) | θ | ±36.5 |
| Synchronization detection angle (degrees) | θbd | 77.6 |
| Arrangement | | |
| Deflecting surface to first surface of scanning lens on side of optical deflector (mm) | d01 | 16 |
| Thickness of scanning lens on side of optical deflector (mm) | d12 | 5 |
| Second surface of scanning lens on light deflector side to third surface of scanning lens on side of surface to be scanned (mm) | d23 | 61.3 |
| Thickness of scanning lens on side of surface to be scanned (mm) | d34 | 4 |
| Fourth surface of scanning lens on side of surface to be scanned to first surface of dust-proof glass (mm) | d45 | 20.7 |
| Thickness of dust-proof glass (mm) | d56 | 1.8 |
| First surface of dust-proof glass to surface to be scanned (mm) | d67 | 82 |
| Focal length of scanning lens (mm) | fp | 167.8 |
| Converging degree of collimator | r0 | 1.00E+30 |
| Optical deflector to convergence point (mm) | | |

Further, in the following description, in this embodiment, as illustrated in FIG. 20, the scanning unit on the side where the light beam is emitted from the deflector 5 upward in the sub-scanning (Z axis) direction is denoted by S1, while the scanning unit on the side where the light beam is emitted downward is denoted by S2.

Figure 21A:
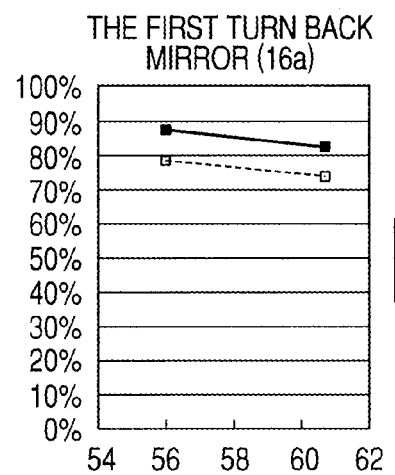
FIG. 21A is a graph of reflectance for S and P polarized light of a turn back mirror according to the second embodiment (first turn back mirror (16a)).
Figure 21B:
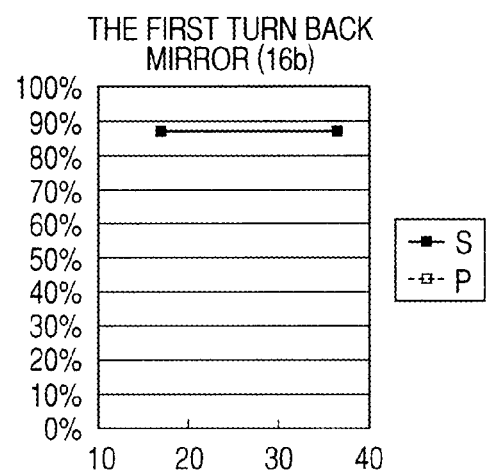
FIG. 21B is a graph of reflectance for S and P polarized light of a turn back mirror according to the second embodiment (first turn back mirror (16b)).
Figure 21C:
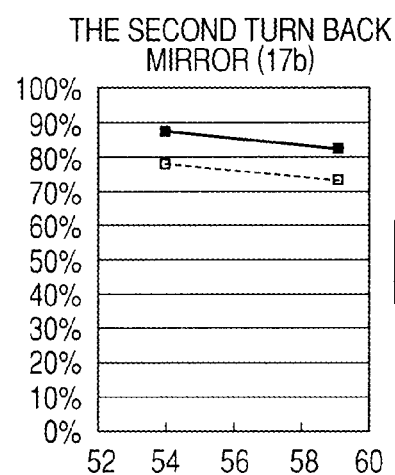
FIG. 21C is a graph of reflectance for S and P polarized light of a turn back mirror according to the second embodiment (second turn back mirror (17b)).

FIGS. 21A, 21B, and 21C illustrate reflectance values Rs(γ1a) (%) and Rp(γ1a) (%) for the S and P polarization components of the turn back mirrors disposed in the scanning units S1 and S2 of this embodiment. FIG. 21A illustrates reflectance values Rs(γ1a) and Rp(γ1a) of the S and P polarization components of the first turn back mirror (16a), FIG. 21B illustrates reflectance values Rs(γ1a) and Rp(γ1a) of the S and P polarization components of the first turn back mirror (16b), and FIG. 21C illustrates reflectance values Rs(γ1a) and Rp(γ1a) of the S and P polarization components of the second turn back mirror (17b).

Similarly to the first embodiment, a comparison example and an embodiment having different rotation amounts of the laser rotation angle θr of the scanning unit S2 are compared. First, the illuminance distribution of the scanning unit S1 is discussed. The laser rotation angle θr of the scanning unit S1 is set to +5.51 degrees.

Figure 22:
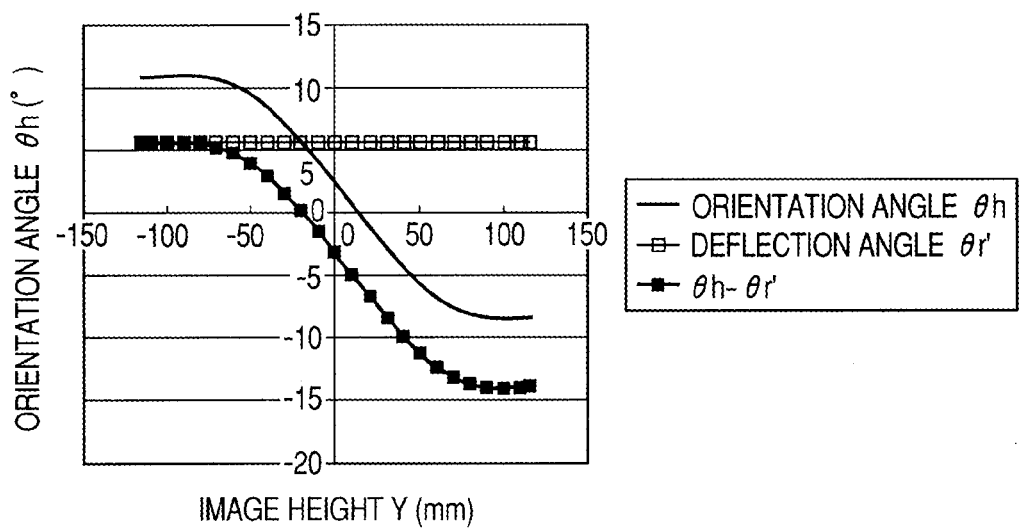
FIG. 22 is a graph of θh and θr' of a scanning unit S1 according to the second embodiment.

Similarly to the case of the first embodiment, FIG. 22 illustrates a relationship between the lens orientation angle θh and the laser polarization angle θr' of the scanning lens 6a in the scanning unit S1 of this comparison example. It is understood that the laser polarization angle θr' has a constant value θr'=+5.51 degrees regardless of the Y coordinate (main scanning direction).

Note that, the laser polarization angle $\theta r'$ is defined in the same manner as in the first embodiment.

Figure 23:
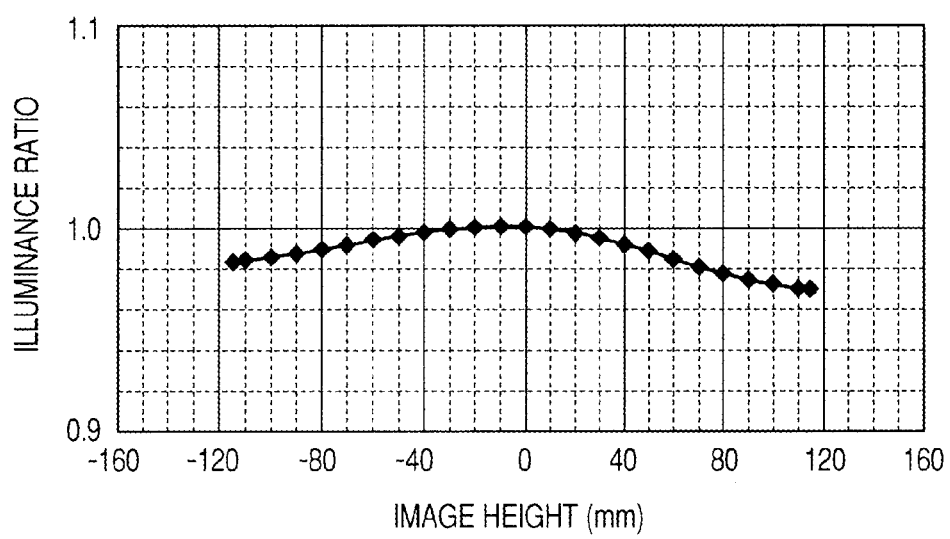
FIG. 23 is a graph showing illuminance distribution of the scanning unit S1 according to the second embodiment.

FIG. 23 illustrates the illuminance distribution on the drum surface (surface to be scanned) in the scanning unit S1 in this embodiment, which is determined on the basis of the equations (1) to (4) and FIGS. 21A, 21B, 21C, and 22. As illustrated in FIG. 23, in the entire image height, the illuminance distribution within 4% is satisfied with respect to illuminance at the image height of 0 mm.

Next, the scanning unit S2 is discussed.

In the scanning units S1 and S2 of this embodiment, the light beam enters the deflecting surface by the oblique incident method, and hence the scanning lens 6a (6b) is shared by the scanning units S1 and S2. Positions on the scanning lens 6a (6b) through which the light beam passes are different up and down in the sub-scanning direction (Z direction) between the scanning units S1 and S2 (see FIG. 20). A shift amount in the sub-scanning direction (Z direction) is 0.8 mm in the positive direction on the scanning unit S1 side, while 0.8 mm in the negative direction on the scanning unit S2 side.

In other words, between the scanning units S1 and S2, the Z coordinates on the lens through which the light beam passes are different from each other, that is, +0.8 mm and −0.8 mm, though the light beam reaches the same image height Y. Therefore, the lens orientation angle at the position where the light beams of the scanning units S1 and S2 pass in the same Y coordinate are reversed from the orientation angle distribution of the saddle type illustrated in FIG. 5A.

Figure 24:
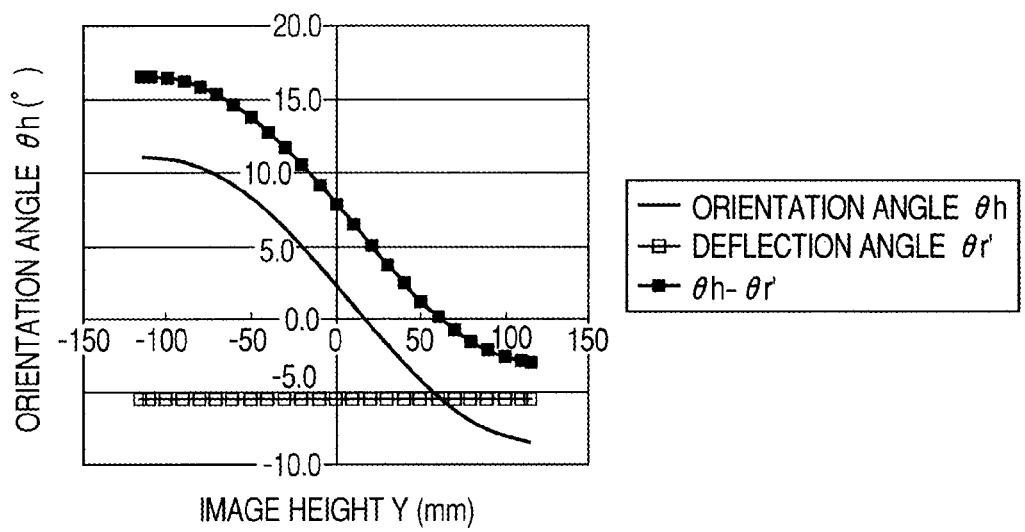
FIG. 24 is a graph of θh and θr' in the case where a laser rotation angle of a scanning unit S2 is 5.51 degrees in the device structure of the second embodiment.

Hereinafter, on the precondition that a monolithic four-beam laser having the same specification as the light source 1a of the scanning unit S1 is used for the light source 1b of the scanning unit S2, a rotation direction of the laser of the light source 1b of the scanning unit S2 that reduces a difference of the illuminance distribution between the scanning unit S1 and the scanning unit S2 is described. Specifically, it is necessary to adjust the light beam interval in the sub-scanning direction on the surface to be scanned 8a (8b) to a predetermined interval between the scanning units S1 and S2. Therefore, the laser rotation angle of the scanning unit S2 is compared between two cases. In one of the cases the size and sign are the same as the laser rotation angle of the scanning unit S1, and in the other case the size is the same as the laser rotation angle of the scanning unit S1 and the sign is different. The illuminance distribution unevenness on the surface to be scanned is described below, which is obtained in the case where the laser rotation angle $\theta r$ of the scanning unit S2 is set to have the same angle and the same sign as the laser rotation angle of the scanning unit S1. Specifically, the laser rotation angle $\theta r$ of the scanning unit S2 is +5.51 degrees. Here, similarly to the case of the scanning unit S1, FIG. 24 illustrates a relationship between the lens orientation angle $\theta h$ and the laser polarization angle $\theta r'$ in the scanning unit S2. The light beam of the scanning unit S2 and the light beam of the scanning unit S1 entering the scanning lens 6 are separate from each other by 1.6 mm in the Z direction with the center of the Z direction interposed therebetween. Therefore, the laser polarization angle $\theta r'$ on the scanning lens 6 has reversed sign with respect to the scanning unit S1 so that $\theta r'$ is −5.51 degrees.

Figure 25:
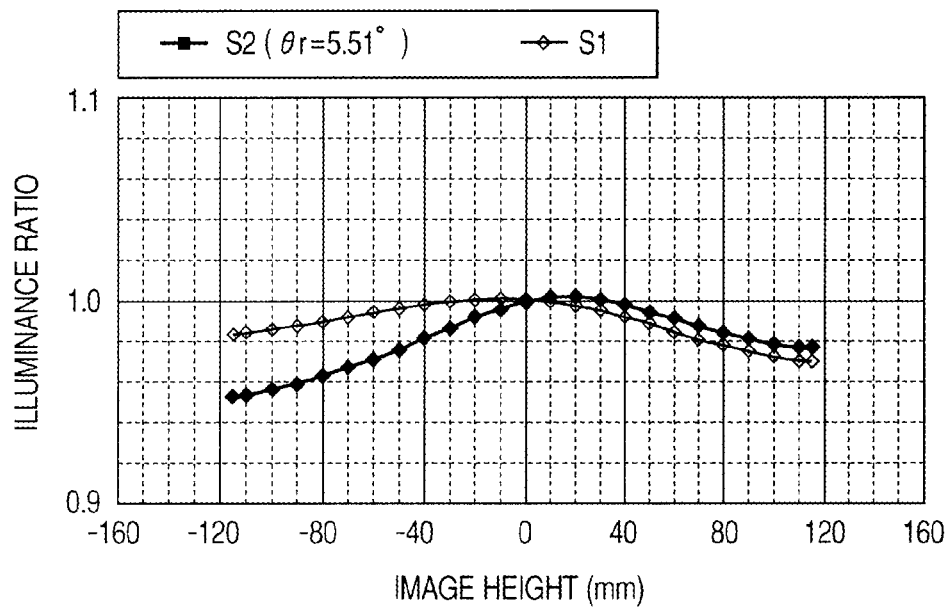
FIG. 25 is a graph showing illuminance distribution in the case where a laser rotation angle of the scanning unit S2 is 5.51 degrees in the device structure of the second embodiment.

Note that, the laser polarization angle $\theta r'$ is defined in the same manner as in the first embodiment. FIG. 25 illustrates the illuminance distribution on the drum surface in the scanning unit S2, which is determined on the basis of the equations (1) to (4) and FIGS. 21A, 21B, 21C, and 24. In contrast to the illuminance distribution of the scanning unit S1, the illuminance distribution of the scanning unit S2 in this comparison example generates an illuminance difference of 3.0 points at most at the image height Y=−115 mm (difference between 98.3% in the scanning unit S1 and 95.3% in the scanning unit S2).

Next, the illuminance distribution unevenness on the surface to be scanned is described below, which is obtained in the case where the laser rotation angle $\theta r$ of the scanning unit S2 is set to −5.51 degrees that is the same angle but has a different sign from the laser rotation angle of the scanning unit S1.

Figure 26:
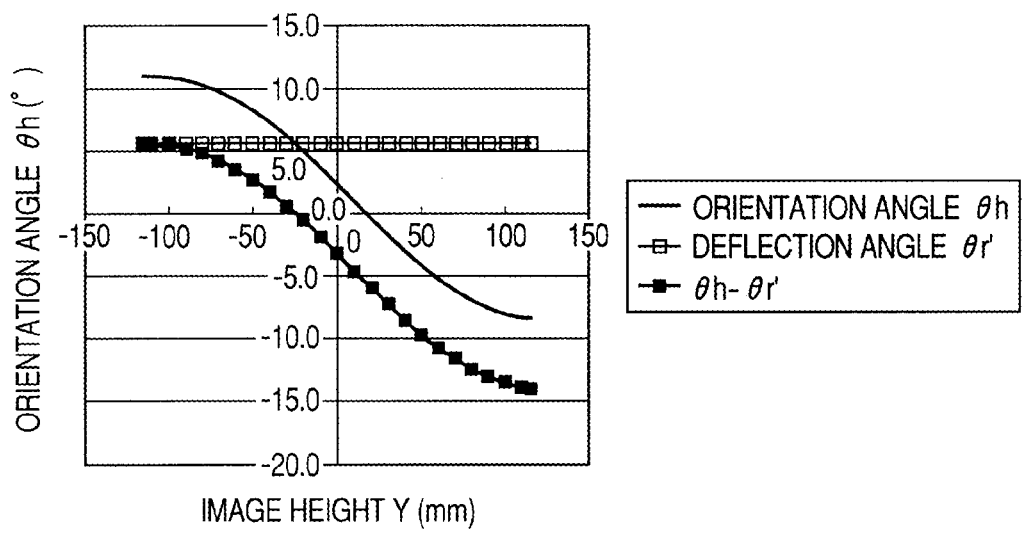
FIG. 26 is a graph of θh and θr' of the scanning unit S2 according to the second embodiment.

Here, similarly to the case of the scanning unit S1 illustrates FIG. 26, the relationship between the lens orientation angle $\theta h$ and the laser polarization angle $\theta r'$ in the scanning unit S2 of this embodiment. The incident region on the scanning lens 6 is different between the light beam of the scanning unit S2 and the light beam of the scanning unit S1 by 1.6 mm in the Z direction with the center in the Z direction interposed therebetween. Therefore, the laser polarization angle $\theta r'$ on the scanning lens 6 is reversed with respect to the scanning unit S1, and the laser polarization angle $\theta r'$ is also reversed so that $\theta r'$ is +5.51 degrees.

Note that, the laser polarization angle $\theta r'$ is defined in the same manner as in the first embodiment.

Figure 27:
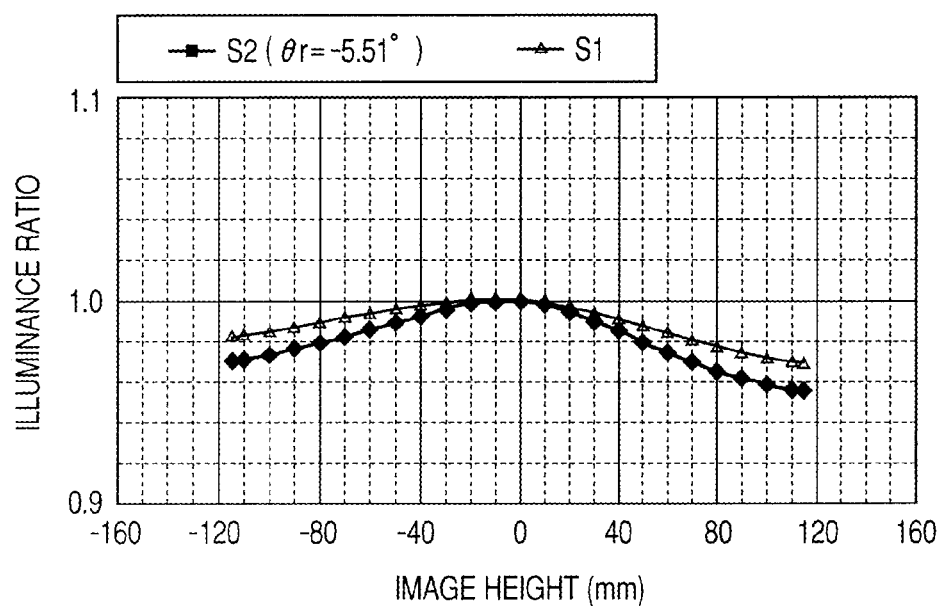
FIG. 27 is a graph showing illuminance distribution of the scanning unit S2 according to the second embodiment.

FIG. 27 illustrates the illuminance distribution on the drum surface of the scanning unit S2 in this embodiment, which is determined on the basis of the equations (1) to (4) and FIGS. 21A, 21B, 21C, and 25. With respect to the illuminance distribution of the scanning unit S1, the illuminance distribution of the scanning unit S2 in this embodiment can be set to have an illuminance difference of 1.4 points at most at the image height Y=+115 mm (difference between 97.0% of the scanning unit S1 and 95.6% of the scanning unit S2), which is a half or smaller of the value 3.0 points in the comparison example.

In the case where the laser rotation angle of the scanning unit S2 is 5.51 degrees, an illuminance distribution difference between the scanning units S1 and S2 is larger than the case where the laser rotation angle is −5.51 degrees. This is because the absolute value of ($\theta h - \theta r'$) is largely different for each image height. Specifically, comparing the value ($\theta h - \theta r'$) at the image height Y=−115 mm, the value is +5 degrees in the scanning unit S1. In the scanning unit S2, the value is +17 degrees in the comparison example where the laser rotation angle is 5.51 degrees, and +5 degrees when the laser rotation angle is −5.51 degrees. This difference causes a difference of the P polarization intensity ratio expressed by the equation (2). As a result, there is caused a difference of the illuminance distribution in the scanning units expressed by the equation (4).

In other words, the difference of ($\theta h - \theta r'$) at the same image height is set not to become large between the scanning units S1 and S2, to thereby reduce the illuminance difference at the same image height between the scanning units. Therefore, also in the second embodiment, similarly to the first embodiment, the difference of ($\theta h - \theta r'$) between the scanning units S1 and S2 can be reduced by satisfying the equation (5). Thus, the illuminance difference at the same image height between the scanning units can be reduced.

Specifically, in this embodiment, the laser polarization angle $\theta r'$ can be also set to the opposite direction to the scanning unit S1 by reversing the sign of the laser rotation angle $\theta r$ of the scanning unit S2 to be opposite to the scanning unit S1. As a result, the absolute value of ($\theta h - \theta r'$) is uniformed in the same direction also in the oblique incident method with one side scanning like this embodiment, in which the absolute value of the orientation angle $\theta h$ of the scanning lens is reversed between the scanning unit S1 and the scanning unit S2.

As a summary of the above discussion, the illuminance distribution unevenness between the scanning units can be reduced by setting appropriately the laser polarization direction between the scanning units also in the case of this embodiment, in which the orientation angle of the polarization direction of the lens material is changed on the lens through which the light beam that is deflected for scanning passes.

The effect of this embodiment applied to the structure of the oblique incident method and the one side scanning system is particularly useful when the orientation angle θh changes largely on the lens through which the light beam passes. In the second embodiment, the maximum value of the orientation angle θh in the region where the light beam enters is 8.5 degrees, the minimum value of the same is −11.0 degrees, and a difference between the maximum value and the minimum value is 19.5 degrees in the region that is used. From this result, the inventor of the present invention found that the present invention can obtain more remarkable effect when a difference between the maximum value and the minimum value of the orientation angle θh on the lens through which the light beam passes is 15 degrees or larger.

As described above, the illuminance distribution unevenness between the scanning units can be reduced by setting appropriately the laser polarization direction between the scanning units also in the case of this embodiment, in which the orientation angle of the polarization direction is changed on the lens through which the light beam that has been deflected for scanning passes.

In this embodiment, a multi-beam light source is used as the light sources 1a and 1b. However, the present invention is not limited thereto, and the same effect can be obtained also in the case where the polarization direction of the single beam light source is inclined in use. In other words, if it can be determined in advance that the polarization direction of the single beam light source is inclined in a certain constant direction due to a manufacturing factor, the attachment direction of the laser may be changed for each station so that the laser polarization direction satisfies the equation (5).

In the second embodiment, similarly to the case of the first embodiment, it is preferred that the positions of the gate parts of the scanning lenses 6a and 6b (scanning lenses 7a and 7b) to be formed in the molding process with respect to an optical axis position be the same in the Y axis direction and in the optical axis directions of the scanning units S1 and S2. In addition, sufficient effect of the present invention can be obtained by constituting so that the equation (5) is satisfied only for the thickest scanning lens among the scanning lenses in the scanning units S1 and S2.

Although the preferred embodiments of the present invention are described above, the present invention is not limited to those embodiments, which can be modified and changed variously within the scope of spirit of the invention.

Color Image Forming Apparatus

Figure 28:
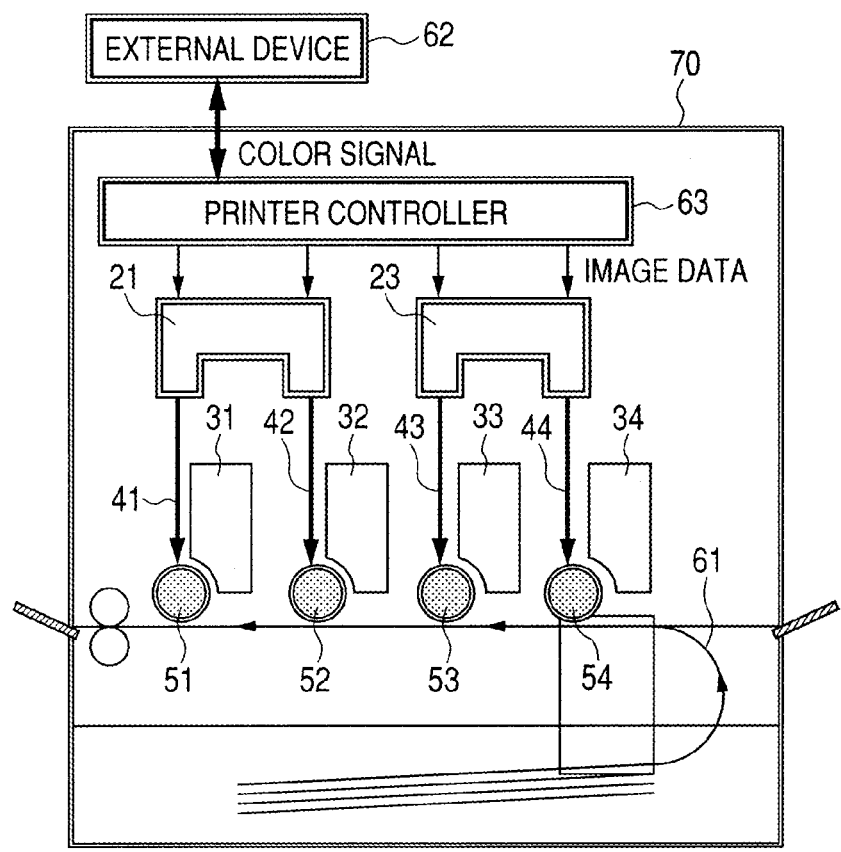
FIG. 28 is a cross sectional view of a main part in a sub-scanning direction illustrating an embodiment of a color image forming apparatus to which the present invention can be applied.

FIG. 28 is a schematic diagram of a main part of a color image forming apparatus using the scanning optical apparatus according to the first or second embodiment of the present invention.

This embodiment describes a tandem type color image forming apparatus in which two scanning optical apparatuses are arranged in parallel so as to record image information (electrostatic latent image) on the surface of a photosensitive drum as an image bearing member.

In FIG. 28, a color image forming apparatus 70 includes scanning optical apparatuses 21 and 23 each of which has the structure of the first or second embodiment, photosensitive drums 51, 52, 53, and 54 as image bearing members, developing devices (developing units) 31, 32, 33, and 34, and a conveyor belt 61. Further, in FIG. 28, a toner image developed by the developing device is transferred onto a transfer material by a transferring unit, and a fixing device (fixing unit) (not shown) fixes the transferred toner image onto the transferring material.

In FIG. 28, the color image forming apparatus 70 is supplied with R (red), G (green), and B (blue) color signals (code data) from an external device 62 such as a personal computer. Those color signals are converted into C (cyan), M (magenta), Y (yellow), and B (black) image data by a printer controller 63 in the apparatus and are supplied to the scanning optical apparatuses 21 and 23.

Then, those scanning optical apparatuses 21 and emit light beams 41, 42, 43, and 44 modulated in accordance with each image data. Those light beams 41, 42, 43, and 44 scan the photosensitive drum surfaces of the photosensitive drums 51, 52, 53, and 54 in the main scanning direction.

The color image forming apparatus to which this embodiment can be applied includes the two scanning optical apparatuses 21 and 23 side by side. Further, each of them supports C (cyan), M (magenta), Y (yellow), and B (black) colors, so as to record the image signal (image information) in parallel on the photosensitive drums 51, 52, 53, and 54, so that a color image is printed at high speed.

The color image forming apparatus to which this embodiment can be applied forms latent images of individual colors on the surfaces of the corresponding photosensitive drums 51, 52, 53, and 54 by using the light beams based on image data in the two scanning optical apparatuses 21 and 23 as described above. After that, multilayer transferring onto the recording material is performed so as to form one full color image.

As the external device 62, for example, a color image reading apparatus provided with a CCD sensor may be used. In this case, the color image reading apparatus and the color image forming apparatus 70 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-255155, filed on Nov. 6, 2009, which is hereby incorporated by reference herein in its entirety.

What is claimed is:

1. A scanning optical apparatus comprising:
   a first scanning unit;
   a second scanning unit; and
   a deflecting unit which deflects a light beam for scanning and is shared by the first scanning unit and the second scanning unit, the deflecting unit having a first deflecting surface and a second deflecting surface which is different from the first deflecting surface,
   wherein the first scanning unit includes:
      a first light source unit having a plurality of light-emitting points;
      a first incident optical system which guides a light beam emitted from the first light source unit to the first deflecting surface of the deflecting unit; and
      a first imaging optical system, which is disposed in an optical path of the light beam emitted from the first light source unit and deflected by the deflecting unit, including at least one imaging optical element for imaging the light beam deflected by the first deflecting surface on a first surface to be scanned,
wherein the first imaging optical system includes a first imaging optical element having a largest maximum value of a thickness in an optical axis direction of the at least one imaging optical element, the first imaging optical element having a birefringence characteristic,
wherein the second scanning unit includes:
a second light source unit having a plurality of light-emitting points;
a second incident optical system which guides a light beam emitted from the second light source unit to the second deflecting surface of the deflecting unit, to deflect the light beam from the second light source unit; and
a second imaging optical system, which is disposed in an optical path of the light beam emitted from the second light source unit and deflected by the deflecting unit, including at least one imaging optical element for imaging the light beam deflected by the second deflecting surface on a second surface to be scanned,
wherein the second imaging optical system includes a second imaging optical element having a largest maximum value of a thickness in an optical axis direction of the at least one imaging optical element included in the second imaging optical system, the second imaging optical element having a birefringence characteristic,
wherein the light beam from the first light source unit and the light beam from the second light source unit scan the first surface to be scanned and the second surface to be scanned by rotating the deflecting unit in directions opposed to each other in a main scanning direction, and
wherein the first scanning unit and the second scanning unit are configured to reduce a difference between:
(a) difference between a slow axis direction of an imaging optical element included in the first imaging optical system and a polarization direction of light beam incident on the first imaging optical system from the first light source unit, and
(b) a difference between a slow axis direction of an imaging optical element included in the second imaging optical system and a polarization direction of light beam incident on the second imaging optical system from the second light source unit.

2. A scanning optical apparatus according to claim 1, wherein:
the first imaging optical element and the second imaging optical element are formed by a molding process, and
where a Y axis is defined as an axis which is parallel to a direction in which scanning with light beam from the first light source is performed by the deflecting unit in the first scanning unit and intersects with an optical axis of the first imaging optical element, and where a plus direction of Y axis is defined as an orientation in which scanning with a light beam from the first light source is performed by the deflecting unit in the first scanning unit and intersects with an optical axis of the first image optical element, positions of gate parts of the first imaging optical element and the second imaging optical element formed in the molding process with respect to an optical axis position are the same position in the Y axis direction and in the optical axis directions of the first imaging optical system and the second imaging optical system.

3. An image forming apparatus comprising:
a scanning optical apparatus; and
a printer controller which converts code data supplied from an external device into an image signal, which is supplied to the scanning optical apparatus,
wherein the scanning optical apparatus comprises:
a first scanning unit;
a second scanning unit; and
a deflecting unit which deflects a light beam for scanning and is shared by the first scanning unit and the second scanning unit, the deflecting unit having a first deflecting surface and a second deflecting surface which is different from the first deflecting surface,
wherein the first scanning unit includes:
a first light source unit having a plurality of light-emitting points;
a first incident optical system which guides a light beam emitted from the first light source unit to the first deflecting surface of the deflecting unit; and
a first imaging optical system, which is disposed in an optical path of the light beam emitted from the first light source unit and deflected by the deflecting unit, including at least one imaging optical element for imaging the light beam deflected by the first deflecting surface on a first surface to be scanned,
wherein the first imaging optical system includes a first imaging optical element having a largest maximum value of a thickness in an optical axis direction of the at least one imaging optical element, the first imaging optical element having a birefringence characteristic,
wherein the second scanning unit includes:
a second light source unit having a plurality of light-emitting points;
a second incident optical system which guides a light beam emitted from the second light source unit to the second deflecting surface of the deflecting unit, to deflect the light beam from the second light source unit; and
a second imaging optical system, which is disposed in an optical path of the light beam emitted from the second light source unit and deflected by the deflecting unit, including at least one imaging optical element for imaging the light beam deflected by the second deflecting surface on a second surface to be scanned,
wherein the second imaging optical system includes a second imaging optical element having a largest maximum value of a thickness in an optical axis direction of the at least one imaging optical element included in the second imaging optical system, the second imaging optical element having a birefringence characteristic,
wherein the light beam from the first light source unit and the light beam from the second light source unit scan the first surface to be scanned and the second surface to be scanned by rotating the deflecting unit in directions opposed to each other in a main scanning direction, and
wherein the first scanning unit and the second scanning unit are configured to reduce a difference between:
(a) a difference between a slow axis direction of an imaging optical element included in the first imaging optical system and a polarization direction of light beam incident on the first imaging optical system from the first light source unit, and
(b) a difference between a slow axis direction of an imaging optical element included in the second imaging optical system and a polarization direction of light beam incident on the second imaging optical system from the second light source unit.

4. A color image forming apparatus comprising:
a plurality of scanning optical apparatuses; and
a plurality of image bearing members which are disposed on surfaces to be scanned of the plurality of scanning optical apparatuses so as to form images of different colors,
wherein each of the scanning optical apparatuses comprises:
a first scanning unit;
a second scanning unit; and
a deflecting unit which deflects a light beam for scanning and is shared by the first scanning unit and the second scanning unit, the deflecting unit having a first deflecting surface and a second deflecting surface which is different from the first deflecting surface,
wherein the first scanning unit includes:
    a first light source unit having a plurality of light-emitting points;
    a first incident optical system which guides a light beam emitted from the first light source unit to the first deflecting surface of the deflecting unit; and
    a first imaging optical system, which is disposed in an optical path of the light beam emitted from the first light source unit and deflected by the deflecting unit, including at least one imaging optical element for imaging the light beam deflected by the first deflecting surface on a first surface to be scanned,
    wherein the first imaging optical system includes a first imaging optical element having a largest maximum value of a thickness in an optical axis direction of the at least one imaging optical element, the first imaging optical element having a birefringence characteristic,
wherein the second scanning unit includes:
    a second light source unit having a plurality of light-emitting points;
    a second incident optical system which guides a light beam emitted from the second light source unit to the second deflecting surface of the deflecting unit, to deflect the light beam from the second light source unit; and
    a second imaging optical system, which is disposed in an optical path of the light beam emitted from the second light source unit and deflected by the deflecting unit, including at least one imaging optical element for imaging the light beam deflected by the second deflecting surface on a second surface to be scanned,
    wherein the second imaging optical system includes a second imaging optical element having a largest maximum value of a thickness in an optical axis direction of the at least one imaging optical element included in the second imaging optical system, the second imaging optical element having a birefringence characteristic,
wherein the light beam from the first light source unit and the light beam from the second light source unit scan the first surface to be scanned and the second surface to be scanned by rotating the deflecting unit in directions opposed to each other in a main scanning direction, and
wherein the first scanning unit and the second scanning unit are configured to reduce a difference between:
(a) a difference between a slow axis direction of an imaging optical element included in the first imaging optical system and a polarization direction of light beam incident on the first imaging optical system from the first light source unit, and
(b) a difference between a slow axis direction of an imaging optical element included in the second imaging optical system and a polarization direction of light beam incident on the second imaging optical system from the second light source unit.

5. A color image forming apparatus according to claim 4, further comprising a printer controller which converts a color signal supplied from an external device into different color image data, which are supplied to the plurality of scanning optical apparatuses.

6. A scanning optical apparatus according to claim 1, wherein each of the first light source unit and the second light source unit emits a laser beam.

7. A scanning optical apparatus comprising:
a first scanning unit;
a second scanning unit; and
a deflecting unit which deflects a light beam for scanning and is shared by the first scanning unit and the second scanning unit, the deflecting unit having a deflecting surface,
wherein the first scanning unit includes:
    a first light source unit having a plurality of light-emitting points;
    a first incident optical system which guides a light beam emitted from the first light source unit to the deflecting surface of the deflecting unit; and
    a first imaging optical system, which is disposed in an optical path of the light beam emitted from the first light source unit and deflected by the deflecting unit, including at least one imaging optical element for imaging the light beam deflected by the deflecting surface on a first surface to be scanned,
    wherein the first imaging optical system includes a first imaging optical element having a largest maximum value of a thickness in an optical axis direction of the at least one imaging optical element, the first imaging optical element having a birefringence characteristic,
wherein the second scanning unit includes:
    a second light source unit having a plurality of light-emitting points;
    a second incident optical system which guides a light beam emitted from the second light source unit to the deflecting surface, to deflect the light beam from the second light source unit; and
    a second imaging optical system, which is disposed in an optical path of the light beam emitted from the second light source unit and deflected by the deflecting unit, including at least one imaging optical element for imaging the light beam deflected by the deflecting surface on a second surface to be scanned,
    wherein the second imaging optical system includes a second imaging optical element having a largest maximum value of a thickness in an optical axis direction of the at least one imaging optical element included in the second imaging optical system, the second imaging optical element having a birefringence characteristic,
wherein the first incident optical system and the second incident optical system respectively guide the light beam from the first light source unit and the light beam from the second light source unit to enter the deflecting surface of the deflecting unit obliquely in a sub-scanning direction, and wherein the first scanning unit and the second scanning unit are configured to reduce a difference between:
(a) difference between a slow axis direction of the first imaging optical element and a polarization direction of light beam incident on the first imaging optical system from the first light source unit, and
(b) a difference between a slow axis direction of the second imaging optical element and a polarization direction of light beam incident on the second imaging optical system from the second light source unit.

8. A scanning optical apparatus according to claim 7, wherein:
the first imaging optical element and the second imaging optical element are formed by a molding process,
where a Y axis is defined as an axis which is parallel to a direction in which scanning with light beam from the first light source is performed by the deflecting unit in the first scanning unit and intersects with an optical axis of the first imaging optical element, and where a plus direction of Y axis is defined as an orientation in which the scanning with light beam from the first light source is performed by the deflecting unit in the first scanning unit and intersects with an optical axis of the first imaging optical element, positions of gate parts of the first imaging optical element and the second imaging optical element formed in the molding process with respect to an optical axis position are the same position in the Y axis direction and in the optical axis directions of the first imaging optical system and the second imaging optical system.

9. An image forming apparatus comprising:
a scanning optical apparatus; and
a printer controller which converts code data supplied from an external device into an image signal, which is supplied to the scanning optical apparatus,
wherein the scanning optical apparatus comprises:
a first scanning unit;
a second scanning unit; and
a deflecting unit which deflects a light beam for scanning and is shared by the first scanning unit and the second scanning unit, the deflecting unit having a deflecting surface,
wherein the first scanning unit includes:
a first light source unit having a plurality of light-emitting points;
a first incident optical system which guides a light beam emitted from the first light source unit to the deflecting surface of the deflecting unit; and
a first imaging optical system, which is disposed in an optical path of the light beam emitted from the first light source unit and deflected by the deflecting unit, including at least one imaging optical element for imaging the light beam deflected by the deflecting surface on a first surface to be scanned,
wherein the first imaging optical system includes a first imaging optical element having a largest maximum value of a thickness in an optical axis direction of the at least one imaging optical element, the first imaging optical element having a birefringence characteristic,
wherein the second scanning unit includes:
a second light source unit having a plurality of light-emitting points;
a second incident optical system which guides a light beam emitted from the second light source unit to the deflecting surface of the deflecting unit; and
a second imaging optical system, which is disposed in an optical path of the light beam emitted from the second light source unit and deflected by the deflecting unit, including at least one imaging optical element for imaging the light beam deflected by the deflecting surface on a second surface to be scanned,
wherein the second imaging optical system includes a second imaging optical element having a largest maximum value of a thickness in an optical axis direction of the at least one imaging optical element included in the second imaging optical system, the second imaging optical element having a birefringence characteristic,
wherein the light beam from the first light source unit and the light beam from the second light source unit scan the first surface to be scanned and the second surface to be scanned by rotating the deflecting unit in directions opposed to each other in a main scanning direction, and
wherein the first scanning unit and the second scanning unit are configured to reduce a difference between:
(a) difference between a slow axis direction of the first imaging optical element and a polarization direction of light beam incident on the first imaging optical system from the first light source unit, and
(b) a difference between a slow axis direction of the second imaging optical element and a polarization direction of light beam incident on the second imaging optical system from the second light source unit.

10. A color image forming apparatus comprising:
a plurality of scanning optical apparatuses each comprising the scanning optical apparatus; and
a plurality of image bearing members which are disposed on surfaces to be scanned of the plurality of scanning optical apparatuses so as to form images of different colors,
wherein the scanning optical apparatus comprises:
a first scanning unit;
a second scanning unit; and
a deflecting unit which deflects a light beam for scanning and is shared by the first scanning unit and the second scanning unit, the deflecting unit having a first deflecting surface and a second deflecting surface which is different from the first deflecting surface,
wherein the first scanning unit includes:
a first light source unit having a plurality of light-emitting points;
a first incident optical system which guides a light beam emitted from the first light source unit to the deflecting surface of the deflecting unit; and
a first imaging optical system, which is disposed in an optical path of the light beam emitted from the first light source unit and deflected by the deflecting unit, including at least one imaging optical element for imaging the light beam deflected by the deflecting surface on a first surface to be scanned,
wherein the first imaging optical system includes a first imaging optical element having a largest maximum value of a thickness in an optical axis direction of the at least one imaging optical element, the first imaging optical element having a birefringence characteristic,
wherein the second scanning unit includes:
a second light source unit having a plurality of light-emitting points;
a second incident optical system which guides a light beam emitted from the second light source unit to the deflecting surface of the deflecting unit; and
a second imaging optical system, which is disposed in an optical path of the light beam emitted from the second light source unit and deflected by the deflecting unit, including at least one imaging optical element for imaging the light beam deflected by the deflecting surface on a second surface to be scanned, wherein the second imaging optical system includes a second imaging optical element having a largest maximum value of a thickness in an optical axis direction of the at least one imaging optical element included in the second imaging optical system, the second imaging optical element having a birefringence characteristic, wherein the light beam from the first light source unit and the light beam from the second light source unit scan the first surface to be scanned and the second surface to be scanned by rotating the deflecting unit in directions opposed to each other in a main scanning direction, and wherein the first scanning unit and the second scanning unit are configured to reduce a difference between:

(a) difference between a slow axis direction of the first imaging optical element and a polarization direction of light beam incident on the first imaging optical system from the first light source unit, and (b) a difference between a slow axis direction of the second imaging optical element and a polarization direction of light beam incident on the second imaging optical system from the second light source unit.

11. A color image forming apparatus according to claim 10, further comprising a printer controller which converts a color signal supplied from an external device into different color image data, which are supplied to the plurality of scanning optical apparatuses.

12. A scanning optical apparatus according to claim 7, wherein each of the first light source unit and the second light source unit emits a laser beam.

13. A scanning optical apparatus comprising:
a first scanning unit;
a second scanning unit; and
a deflecting unit which deflects a light beam for scanning and is shared by the first scanning unit and the second scanning unit, the deflecting unit having a first deflecting surface and a second deflecting surface which is different from the first deflecting surface, wherein the first scanning unit includes:
a first light source unit having a plurality of light-emitting points;
a first incident optical system which guides a light beam emitted from the first light source unit to the first deflecting surface of the deflecting unit; and
a first imaging optical system, which is disposed in an optical path of the light beam emitted from the first light source unit and deflected by the deflecting unit, including at least one imaging optical element for imaging the light beam deflected by the first deflecting surface on a first surface to be scanned, wherein the first imaging optical system includes a first imaging optical element having a largest maximum value of a thickness in an optical axis direction of the at least one imaging optical element, the first imaging optical element having a birefringence characteristic, wherein the second scanning unit includes:
a second light source unit having a plurality of light-emitting points;
a second incident optical system which guides a light beam emitted from the second light source unit to the second deflecting surface of the deflecting unit, to deflect the light beam from the second light source unit; and a second imaging optical system, which is disposed in an optical path of the light beam emitted from the second light source unit and deflected by the deflecting unit, including at least one imaging optical element for imaging the light beam deflected by the second deflecting surface on a second surface to be scanned, wherein the second imaging optical system includes a second imaging optical element having a largest maximum value of a thickness in an optical axis direction of the at least one imaging optical element included in the second imaging optical system, the second imaging optical element having a birefringence characteristic, wherein the light beam from the first light source unit and the light beam from the second light source unit scan the first surface to be scanned and the second surface to be scanned by rotating the deflecting unit in directions opposed to each other in a main scanning direction, and wherein the following expressions are satisfied:

$$Y1min \times \theta2r > 0,$$

in a case where $$Y1min \times \theta1r > 0$$

is satisfied; and $$Y1min \times \theta2r < 0,$$

in a case where $$Y1min \times \theta1r < 0$$

is satisfied, where a direction in which the first surface to be scanned is scanned with the light beam from the first light source unit in the main scanning direction is defined as a positive direction of a Y axis, $\theta1h(y)$ and $\theta2h(y)$ respectively denote orientation angles that are angles between the main scanning direction and a slow axis direction at a position y in the Y axis direction when an intersection between the Y axis and a plane perpendicular to the Y axis including the optical axis is regarded as an origin of the Y axis in the first imaging optical element and the second imaging optical element, $\theta1r$ and $\theta2r$ respectively denote angles between the Y axis and polarization directions of the light beams reaching the first imaging optical element and the second imaging optical element, and Y1 min denotes a position in the Y axis direction at which the orientation angle $\theta1h(y)$ becomes minimum.

14. An image forming apparatus comprising:
a scanning optical apparatus; and
a printer controller which converts code data supplied from an external device into an image signal, which is supplied to the scanning optical apparatus, wherein the scanning optical apparatus comprises:
a first scanning unit;
a second scanning unit; and
a deflecting unit which deflects a light beam for scanning and is shared by the first scanning unit and the second scanning unit, the deflecting unit having a first deflecting surface and a second deflecting surface which is different from the first deflecting surface, wherein the first scanning unit includes:
a first light source unit having a plurality of light-emitting points;
a first incident optical system which guides a light beam emitted from the first light source unit to the first deflecting surface of the deflecting unit; and a first imaging optical system, which is disposed in an optical path of the light beam emitted from the first light source unit and deflected by the deflecting unit, including at least one imaging optical element for imaging the light beam deflected by the first deflecting surface on a first surface to be scanned, wherein the first imaging optical system includes a first imaging optical element having a largest maximum value of a thickness in an optical axis direction of the at least one imaging optical element, the first imaging optical element having a birefringence characteristic, wherein the second scanning unit includes:
   a second light source unit having a plurality of light-emitting points;
   a second incident optical system which guides a light beam emitted from the second light source unit to the second deflecting surface of the deflecting unit, to deflect the light beam from the second light source unit; and
   a second imaging optical system, which is disposed in an optical path of the light beam emitted from the second light source unit and deflected by the deflecting unit, including at least one imaging optical element for imaging the light beam deflected by the second deflecting surface on a second surface to be scanned, wherein the second imaging optical system includes a second imaging optical element having a largest maximum value of a thickness in an optical axis direction of the at least one imaging optical element included in the second imaging optical system, the second imaging optical element having a birefringence characteristic, wherein the light beam from the first light source unit and the light beam from the second light source unit scan the first surface to be scanned and the second surface to be scanned by rotating the deflecting unit in directions opposed to each other in a main scanning direction, and wherein the following expressions are satisfied:

$$Y1min \times \theta 2r > 0,$$

in a case where $$Y1min \times \theta 1r > 0$$

is satisfied; and $$Y1min \times \theta 2r < 0,$$

in a case where $$Y1min \times \theta 1r < 0$$

is satisfied, where a direction in which the first surface to be scanned is scanned with the light beam from the first light source unit in the main scanning direction is defined as a positive direction of a Y axis, $\theta 1h(y)$ and $\theta 2h(y)$ respectively denote orientation angles that are angles between the main scanning direction and a slow axis direction at a position y in the Y axis direction when an intersection between the Y axis and a plane perpendicular to the Y axis including the optical axis is regarded as an origin of the Y axis in the first imaging optical element and the second imaging optical element, $\theta 1r$ and $\theta 2r$ respectively denote angles between the Y axis and polarization directions of the light beams reaching the first imaging optical element and the second imaging optical element, and Y1 min denotes a position in the Y axis direction at which the orientation angle $\theta 1h(y)$ becomes minimum.

15. A color image forming apparatus comprising:
a plurality of scanning optical apparatuses each comprising the scanning optical apparatus; and
a plurality of image bearing members which are disposed on surfaces to be scanned of the plurality of scanning optical apparatuses so as to form images of different colors, wherein the scanning optical apparatus comprises:
   a first scanning unit;
   a second scanning unit; and
   a deflecting unit which deflects a light beam for scanning and is shared by the first scanning unit and the second scanning unit, the deflecting unit having a first deflecting surface and a second deflecting surface which is different from the first deflecting surface, wherein the first scanning unit includes:
   a first light source unit having a plurality of light-emitting points;
   a first incident optical system which guides a light beam emitted from the first light source unit to the first deflecting surface of the deflecting unit; and
   a first imaging optical system, which is disposed in an optical path of the light beam emitted from the first light source unit and deflected by the deflecting unit, including at least one imaging optical element for imaging the light beam deflected by the first deflecting surface on a first surface to be scanned, wherein the first imaging optical system includes a first imaging optical element having a largest maximum value of a thickness in an optical axis direction of the at least one imaging optical element, the first imaging optical element having a birefringence characteristic, wherein the second scanning unit includes:
   a second light source unit having a plurality of light-emitting points;
   a second incident optical system which guides a light beam emitted from the second light source unit to the second deflecting surface of the deflecting unit, to deflect the light beam from the second light source unit; and
   a second imaging optical system, which is disposed in an optical path of the light beam emitted from the second light source unit and deflected by the deflecting unit, including at least one imaging optical element for imaging the light beam deflected by the second deflecting surface on a second surface to be scanned, wherein the second imaging optical system includes a second imaging optical element having a largest maximum value of a thickness in an optical axis direction of the at least one imaging optical element included in the second imaging optical system, the second imaging optical element having a birefringence characteristic, wherein the light beam from the first light source unit and the light beam from the second light source unit scan the first surface to be scanned and the second surface to be scanned by rotating the deflecting unit in directions opposed to each other in a main scanning direction, and wherein the following expressions are satisfied:

$$Y1min \times \theta 2r > 0,$$

in a case where $$Y1min \times \theta 1r > 0$$

is satisfied; and $$Y1min \times \theta 2r < 0,$$

in a case where $$Y1\min \times \theta 1r < 0$$

is satisfied,
where a direction in which the first surface to be scanned is scanned with the light beam from the first light source unit in the main scanning direction is defined as a positive direction of a Y axis, $\theta 1h(y)$ and $\theta 2h(y)$ respectively denote orientation angles that are angles between the main scanning direction and a slow axis direction at a position y in the Y axis direction when an intersection between the Y axis and a plane perpendicular to the Y axis including the optical axis is regarded as an origin of the Y axis in the first imaging optical element and the second imaging optical element, $\theta 1r$ and $\theta 2r$ respectively denote angles between the Y axis and polarization directions of the light beams reaching the first imaging optical element and the second imaging optical element, and Y1 min denotes a position in the Y axis direction at which the orientation angle $\theta 1h(y)$ becomes minimum.

16. A scanning optical apparatus comprising:
a first scanning unit;
a second scanning unit; and
a deflecting unit which deflects a light beam for scanning and is shared by the first scanning unit and the second scanning unit, the deflecting unit having a deflecting surface,
wherein the first scanning unit includes:
  a first light source unit having a plurality of light-emitting points;
  a first incident optical system which guides a light beam emitted from the first light source unit to the deflecting surface of the deflecting unit; and
  a first imaging optical system, which is disposed in an optical path of the light beam emitted from the first light source unit and deflected by the deflecting unit, including at least one imaging optical element for imaging the light beam deflected by the deflecting surface on a first surface to be scanned,
  wherein the first imaging optical system includes a first imaging optical element having a largest maximum value of a thickness in an optical axis direction of the at least one imaging optical element, the first imaging optical element having a birefringence characteristic,
wherein the second scanning unit includes:
  a second light source unit having a plurality of light-emitting points;
  a second incident optical system which guides a light beam emitted from the second light source unit to the deflecting surface, to deflect the light beam from the second light source unit; and
  a second imaging optical system, which is disposed in an optical path of the light beam emitted from the second light source unit and deflected by the deflecting unit, including at least one imaging optical element for imaging the light beam deflected by the deflecting surface on a second surface to be scanned,
  wherein the second imaging optical system includes a second imaging optical element having a largest maximum value of a thickness in an optical axis direction of the at least one imaging optical element included in the second imaging optical system, the second imaging optical element having a birefringence characteristic,
wherein the first incident optical system and the second incident optical system respectively guide the light beam from the first light source unit and the light beam from the second light source unit to enter the deflecting surface of the deflecting unit obliquely in a sub-scanning direction, and
wherein the following expressions are satisfied:

$$Y1\min \times \theta 2r > 0,$$

in a case where $$Y1\min \times \theta 1r > 0$$

is satisfied; and $$Y1\min \times \theta 2r < 0,$$

in a case where $$Y1\min \times \theta 1r < 0$$

is satisfied,
where a direction in which the first surface to be scanned is scanned with the light beam from the first light source unit in the main scanning direction is defined as a positive direction of a Y axis, $\theta 1h(y)$ and $\theta 2h(y)$ respectively denote orientation angles that are angles between the main scanning direction and a slow axis direction at a position y in the Y axis direction when an intersection between the Y axis and a plane perpendicular to the Y axis including the optical axis is regarded as an origin of the Y axis in the first imaging optical element and the second imaging optical element, $\theta 1r$ and $\theta 2r$ respectively denote angles between the Y axis and polarization directions of the light beams reaching the first imaging optical element and the second imaging optical element, and Y1min denotes a position in the Y axis direction at which the orientation angle $\theta 1h(y)$ becomes minimum.

17. An image forming apparatus comprising:
a scanning optical apparatus; and
a printer controller which converts code data supplied from an external device into an image signal, which is supplied to the scanning optical apparatus,
wherein the scanning optical apparatus comprises:
a first scanning unit;
  a second scanning unit; and
  a deflecting unit which deflects a light beam for scanning and is shared by the first scanning unit and the second scanning unit, the deflecting unit having a deflecting surface,
  wherein the first scanning unit includes:
  a first light source unit having a plurality of light-emitting points;
  a first incident optical system which guides a light beam emitted from the first light source unit to the deflecting surface of the deflecting unit; and
  a first imaging optical system, which is disposed in an optical path of the light beam emitted from the first light source unit and deflected by the deflecting unit, including at least one imaging optical element for imaging the light beam deflected by the deflecting surface on a first surface to be scanned,
  wherein the first imaging optical system includes a first imaging optical element having a largest maximum value of a thickness in an optical axis direction of the at least one imaging optical element, the first imaging optical element having a birefringence characteristic,
wherein the second scanning unit includes:
  a second light source unit having a plurality of light-emitting points;
  a second incident optical system which guides a light beam emitted from the second light source unit to the deflecting surface of the deflecting unit, to deflect the light beam from the first light source unit; and a second imaging optical system, which is disposed in an optical path of the light beam emitted from the second light source unit and deflected by the deflecting unit, including at least one imaging optical element for imaging the light beam deflected by the deflecting surface on a second surface to be scanned, wherein the second imaging optical system includes a second imaging optical element having a largest maximum value of a thickness in an optical axis direction of the at least one imaging optical element included in the second imaging optical system, the second imaging optical element having a birefringence characteristic, wherein the light beam from the first light source unit and the light beam from the second light source unit scan the first surface to be scanned and the second surface to be scanned by rotating the deflecting unit in directions opposed to each other in a main scanning direction, and wherein the following expressions are satisfied:

$$Y1\min \times \theta 2r > 0,$$

in a case where $$Y1\min \times \theta 1r > 0$$

is satisfied; and $$Y1\min \times \theta 2r < 0$$

in a case where $$Y1\min \times \theta 1r < 0$$

is satisfied, where a direction in which the first surface to be scanned is scanned with the light beam from the first light source unit in the main scanning direction is defined as a positive direction of a Y axis, $\theta 1h(y)$ and $\theta 2h(y)$ respectively denote orientation angles that are angles between the main scanning direction and a slow axis direction at a position y in the Y axis direction when an intersection between the Y axis and a plane perpendicular to the Y axis including the optical axis is regarded as an origin of the Y axis in the first imaging optical element and the second imaging optical element, $\theta 1r$ and $\theta 2r$ respectively denote angles between the Y axis and polarization directions of the light beams reaching the first imaging optical element and the second imaging optical element, and Y1 min denotes a position in the Y axis direction at which the orientation angle $\theta 1h(y)$ becomes minimum.

18. A color image forming apparatus comprising:

a plurality of scanning optical apparatuses each comprising the scanning optical apparatus; and a plurality of image bearing members which are disposed on surfaces to be scanned of the plurality of scanning optical apparatuses so as to form images of different colors, wherein the scanning optical apparatus comprises:
a first scanning unit;
a second scanning unit; and
a deflecting unit which deflects a light beam for scanning and is shared by the first scanning unit and the second scanning unit, the deflecting unit having a deflecting surface, wherein the first scanning unit includes:
a first light source unit having a plurality of light-emitting points;
a first incident optical system which guides a light beam emitted from the first light source unit to the deflecting surface of the deflecting unit; and a first imaging optical system, which is disposed in an optical path of the light beam emitted from the first light source unit and deflected by the deflecting unit, including at least one imaging optical element for imaging the light beam deflected by the first deflecting surface on a first surface to be scanned, wherein the first imaging optical system includes a first imaging optical element having a largest maximum value of a thickness in an optical axis direction of the at least one imaging optical element, the first imaging optical element having a birefringence characteristic, wherein the second scanning unit includes:
a second light source unit having a plurality of light-emitting points;
a second incident optical system which guides a light beam emitted from the second light source unit to the deflecting surface of the deflecting unit, to deflect the light beam from the first light source unit; and a second imaging optical system, which is disposed in an optical path of the light beam emitted from the second light source unit and deflected by the deflecting unit, including at least one imaging optical element for imaging the light beam deflected by the deflecting surface on a second surface to be scanned, wherein the second imaging optical system includes a second imaging optical element having a largest maximum value of a thickness in an optical axis direction of the at least one imaging optical element included in the second imaging optical system, the second imaging optical element having a birefringence characteristic, wherein the light beam from the first light source unit and the light beam from the second light source unit scan the first surface to be scanned and the second surface to be scanned by rotating the deflecting unit in directions opposed to each other in a main scanning direction, and wherein the following expressions are satisfied:

$$Y1\min \times \theta 2r > 0,$$

in a case where $$Y1\min \times \theta 1r > 0$$

is satisfied; and $$Y1\min \times \theta 2r < 0,$$

in a case where $$Y1\min \times \theta 1r < 0$$

is satisfied, where a direction in which the first surface to be scanned is scanned with the light beam from the first light source unit in the main scanning direction is defined as a positive direction of a Y axis, $\theta 1h(y)$ and $\theta 2h(y)$ respectively denote orientation angles that are angles between the main scanning direction and a slow axis direction at a position y in the Y axis direction when an intersection between the Y axis and a plane perpendicular to the Y axis including the optical axis is regarded as an origin of the Y axis in the first imaging optical element and the second imaging optical element, $\theta 1r$ and $\theta 2r$ respectively denote angles between the Y axis and polarization directions of the light beams reaching the first imaging optical element and the second imaging optical element, and Y1 min denotes a position in the Y axis direction at which the orientation angle $\theta 1h(y)$ becomes minimum.

* * * * *